(12) United States Patent
Payette et al.

(10) Patent No.: US 9,113,486 B2
(45) Date of Patent: Aug. 18, 2015

(54) METHOD AND APPARATUS FOR CONTROLLING WIRELESS UPLINK SESSIONS

(75) Inventors: Charles R. Payette, Oceanport, NJ (US); Bruce R. Cilli, Atlantic Highlands, NJ (US); Zulfiquar Sayeed, Hightstown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 585 days.

(21) Appl. No.: 13/208,465

(22) Filed: Aug. 12, 2011

(65) Prior Publication Data

US 2013/0042275 A1 Feb. 14, 2013

(51) Int. Cl.
| | |
|---|---|
| H04N 21/24 | (2011.01) |
| H04N 21/442 | (2011.01) |
| H04N 21/462 | (2011.01) |
| H04N 21/63 | (2011.01) |
| H04N 21/6373 | (2011.01) |
| H04W 72/12 | (2009.01) |
| H04W 72/00 | (2009.01) |
| H04N 21/414 | (2011.01) |
| H04N 21/61 | (2011.01) |

(Continued)

(52) U.S. Cl.
CPC ........... *H04W 72/12* (2013.01); *H04N 21/2408* (2013.01); *H04N 21/41407* (2013.01); *H04N 21/6131* (2013.01); *H04N 21/64784* (2013.01); *H04W 72/00* (2013.01); *H04W 72/042* (2013.01)

(58) Field of Classification Search
None
See application file for complete search history.

(56) References Cited

U.S. PATENT DOCUMENTS

| 6,957,071 B1 | 10/2005 | Holur et al. |
| 7,599,706 B2 | 10/2009 | Zhang et al. |

(Continued)

FOREIGN PATENT DOCUMENTS

| EP | 1 126 716 A1 | 8/2001 |
| JP | A 2002-532959 | 10/2002 |

(Continued)

OTHER PUBLICATIONS

The International Search Report and the Written Opinion of the International Searching Authority, or the Declaration in PCT/US2012/049914, mailed Oct. 17, 2012, Alcatel-Lucent USA Inc., Applicant, 13 pages.

(Continued)

*Primary Examiner* — Brian T Pendleton
*Assistant Examiner* — Jean D Saint Cyr
(74) *Attorney, Agent, or Firm* — Wall & Tong, LLP

(57) ABSTRACT

A video session scheduling capability is disclosed. The video session scheduling capability enables scheduling of video transmissions by mobile devices of a cellular sector. In response to a request by a mobile device to transmit a video via a wireless uplink of the cellular sector, a scheduler determines scheduling of the video session. The scheduler receives information indicative of an amount of wireless uplink resources available for supporting uplink video sessions within the cellular sector, receives information associated with the request by the mobile device to establish a video session for transmission of video content from the mobile device via a wireless uplink in the cellular sector, and determines, using the information indicative of an amount of wireless uplink resources available within the cellular sector and the information associated with the video session request, scheduling of the video session via the wireless uplink in the cellular sector.

29 Claims, 8 Drawing Sheets

(51) Int. Cl.
*H04N 21/647* (2011.01)
*H04W 72/04* (2009.01)

(56) References Cited

U.S. PATENT DOCUMENTS

| | | | |
|---|---|---|---|
| 2001/0004767 A1* | 6/2001 | Gordon et al. | 725/87 |
| 2002/0080816 A1* | 6/2002 | Spinar et al. | 370/449 |
| 2007/0180476 A1* | 8/2007 | Muoio et al. | 725/80 |
| 2008/0298275 A1 | 12/2008 | De Sousa | |
| 2009/0247204 A1* | 10/2009 | Sennett et al. | 455/512 |
| 2011/0075596 A1 | 3/2011 | Moreira et al. | |
| 2012/0005361 A1* | 1/2012 | Knittle | 709/231 |
| 2012/0064908 A1* | 3/2012 | Fox et al. | 455/452.2 |
| 2012/0110119 A1* | 5/2012 | Levicki et al. | 709/217 |
| 2013/0024901 A1 | 1/2013 | Sharif-Ahmadi et al. | |

FOREIGN PATENT DOCUMENTS

| | | |
|---|---|---|
| JP | A 2010-136395 | 6/2010 |
| JP | A 2011-035442 | 2/2011 |
| JP | A 2012-533918 | 12/2012 |
| WO | WO 99/07170 A2 | 2/1999 |
| WO | WO 2010/112074 A1 | 10/2010 |
| WO | WO 2011/035443 A1 | 3/2011 |

OTHER PUBLICATIONS

The International Search Report and the Written Opinion of the International Searching Authority, or the Declaration in PCT/US2012/049920, mailed Nov. 6, 2012, Alcatel Lucent, Applicant, 12 pages.
QUALCOMM: "Signalling for MTSI Dynamic Video Adaptation", 3GPP Draft; S4-AHM084 Signalling for Dynamic Video Adaptation (Update), 3$^{rd}$ Generation Partnership Project (3GPP), Mobile Competence Centre; 650, Route Des Lucioles; F-06921 Sophia-Antipolis Cedex; France, vol. SA WG4, no. Paris, France; Dec. 11, 2006, XP050282382, [retrieved on Dec. 11, 2006].
3rd Generation Partnership Project, "Policy and Charging Control Architecture (Release 10)," 3GPP TS 23.203, v10.3.0, Mar. 2011, <http://www.3gpp.org/ftp/Specs/html-info/23203.htm>.
3rd Generation Partnership Project, "Enabling Coder Selection and Rate Adaptation for UTRAN and E-UTRAN for Load Adaptive Applications, Stage 2 (Release 10)," 3GPP TS 23.860, v10.0.0, Jun. 2010, <http://www.3gpp.org/ftp/Specs/html-info/23860.htm>.
3rd Generation Partnership Project, "IP Multimedia Subsystem (IMS), Multimedia Telephony, Media Handling and Interaction (Release 10)," 3GPP TS 26.114, v10.0.0, Mar. 2011, <http://www.3gop.org/ftp/Specs/html-info/26114.htm>.
S. J. Bae, J. J. Lee, B.-G. Choi, S. Kwon, and M. Y. Chung, "A Resource-Estimated Call Admission Control Algorithm in 3GPP LTE System," Proc. Internat. Conf. on Comput. Sci. And Its Applications: Part II (ICCSA '09) (Suwon, Kor., 2009), pp. 250-260.

J. Ott, S. Wenger, N. Sato, C. Burmeister, and J.Rey, "Extended RTP Profile for RealTime Transport Control Protocol (RTCP)-Based Feedback (RTP/AVPF)," IETF RFC 4585, Jul. 2006, <http://www.ietf.org/rfc/rfc4585.txt>.
R. Pantos (ed.) and W. May, "HTTP Live Streaming," IETF Internet Draft, Mar. 31, 2011, <http://tools.ietf.org/html/draft-pantos-http-live-streaming>.
K. Ramakrishnan, S. Floyd, and D. Black, "The Addition of Explicit Congestion Notification (ECN) to IP," IETF RFC 3168, Sep. 2001, <http://www.ietf.orghfc/rfc3168.txt>.
H. Schulzrinne, S. Casner, R. Frederick, and V. Jacobson, "RTP: A Transport Protocol for Real-Time Applications," IETF RFC 3550, Jul. 2003, <http://www.ietf/org/rfc/rfc3550.txt>.
H. Schwarz, D. Marne, and T. Wiegand, "Overview of the Scalable Video Coding Extension of the H.264/AVC Standard," IEEE Trans. Circuits Syst. Video Technol., 17:9 (2007), pp. 1103-1120.
V. Singh, J. Ott, and I. D. D. Curcio, "Rate Adaptation for Conversational 3G Video," Proc. 28th IEEE Internat. Conf. on Comput. Commun. Workshops (INFOCOM Workshops '09) (Rio de Janeiro, Bra., 2009), pp. 205-211.
S. Wenger, U. Chandra, M. Westerlund, and B. Burman, "Codec Control Messages in the RTP Audio-Visual Profile with Feedback (AVPF)," IETF RFC 5104, Feb. 2008, <http://www.ietf.org/rfc/rfc5104.txt>.
M. Westerlund, I. Johansson, C. Perkins, P. O'Hanlon, and K. Carlberg, "Explicit Congestion Notification (ECN) for RTP over UDP," IETF Internet Draft, Oct. 25, 2010, <http://tools.ietf.org/html/draft-ietf-avt-ecn-for-rtp-03>.
M. Westerlund and S. Wenger, "RTP Topologies," NWG RFC 5117, Jan. 2008, <http://www.ietf.org/rfc/rfc5117.txt>.
I.Johansson and M. Westerlund, "Support for Reduced-Size Real-Time Transport Control Protocol (RTCP): Opportunities and Consequences," NWG RFC 5506, Apr. 2009, <http://tools.ietf.org/html/rfc5506.>.
3rd Generation Partnership Project, "Multimedia Broadcast/Multicast Service (MBMS), Architecture and Functional Description," 3GPP TS 23.246, v. 9.5.0, Jun. 2010, <http://www.3gpp.org/ftp/Specs/html-info/23246.htm>.
Google, "Android SDK: MediaRecorder, Class Overview, MediaRecorder State Diagram," Android Developers, Retrieved on Aug. 19, 2011, <http://developer.android.com/reference/android/media/MediaRecorder.html>.
J. Ott, J. Chesterfield and E. Schooler, "RTP Control Protocol (RTCP) Extensions for the Single-Source Multicast Sessions with Unicast Feedback," IETF RFC 5760, Feb. 2010, <http://www.rfc-editor.org/rfc/rfc5760.text.I.>.
QUALCOMM Europe, S.A.R.L., "Measurement Based Signalling for MTSI Video Dynamic Rate Adaptation," 3GPP SA#50 Meeting, Tdoc S4-080483, France, Aug. 18-22, 2008.
Japanese Office Action in corresponding JP Application No. 2014-526072, dated Feb. 24, 2015.

* cited by examiner

METHOD AND APPARATUS FOR CONTROLLING WIRELESS UPLINK SESSIONS

CROSS-REFERENCE TO RELATED APPLICATIONS

This application is related to U.S. patent application Ser. No. 13/208,478, filed Aug. 12, 2011, entitled "METHOD AND APPARATUS FOR CONTROLLING WIRELESS UPLINK SESSIONS," which is hereby incorporated by reference herein in its entirety.

TECHNICAL FIELD

The invention relates generally to communication networks and, more specifically but not exclusively, to management of wireless uplink sessions in wireless communication networks.

BACKGROUND

In various wireless ecosystems (e.g., Third Generation (3G) wireless networks, Fourth Generation (4G) wireless networks, and the like) many of the mobile user devices are equipped with video capture capabilities. This, coupled with the continuing increases in the use of social media sites (e.g., Facebook, Twitter, blogs, and the like), results in the potential to cause significant growth in the capture and streaming of video from mobile user devices. However, this potential is severely tempered due to bandwidth limitations on the wireless uplink from the mobile user devices to the wireless network.

SUMMARY

Various deficiencies in the prior art are addressed by embodiments for scheduling video sessions within a wireless network.

In one embodiment, an apparatus includes a processor and a memory, where the processor is configured to schedule a video session within a cellular sector of a wireless network. The processor is configured to receive uplink resource information indicative of an amount of wireless uplink resources available for supporting uplink video sessions within the cellular sector, receive video session request information associated with a request by a mobile device to establish a video session for transmission of video content from the mobile device via a wireless uplink in the cellular sector, and determine, using the uplink resource information and the video session request information, scheduling of the video session via the wireless uplink in the cellular sector.

In one embodiment, a computer-readable storage medium stores instructions which, when executed by a computer, cause the computer to perform a method for scheduling a video session within a cellular sector of a wireless network. The method includes receiving uplink resource information indicative of an amount of wireless uplink resources available for supporting uplink video sessions within the cellular sector, receiving video session request information associated with a request by a mobile device to establish a video session for transmission of video content from the mobile device via a wireless uplink in the cellular sector, and determining, using the uplink resource information and the video session request information, scheduling of the video session via the wireless uplink in the cellular sector.

In one embodiment, a method for scheduling a video session within a cellular sector of a wireless network is provided. The method includes receiving uplink resource information indicative of an amount of wireless uplink resources available for supporting uplink video sessions within the cellular sector, receiving video session request information associated with a request by a mobile device to establish a video session for transmission of video content from the mobile device via a wireless uplink in the cellular sector, and determining, using the uplink resource information and the video session request information, scheduling of the video session via the wireless uplink in the cellular sector.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

In general, a wireless uplink control capability is depicted and described herein, although various other capabilities also may be presented herein.

In at least some embodiments, the wireless uplink control capability enables consistently reliable video transmissions on the wireless uplink of a cellular sector in a cellular-based communication networks using various capabilities that enable more efficient utilization of wireless uplink resources while increasing the quality-of-experience (QoE) of the users.

In at least some embodiments, the wireless uplink control capability includes a video session scheduling capability. The video session scheduling capability enables scheduling of video transmissions by mobile devices of a cellular sector. For example, where a mobile device requests to transmit a video via a wireless uplink of the cellular sector, the video session scheduling capability determines one or more parameters associated with establishment of a video session for the mobile device (e.g., a time at which the video session may begin, a maximum transmission bit rate allocation for the video session, and the like). It is noted that the video session scheduling capability may support various other features and functions.

In at least some embodiments, the wireless uplink control capability includes a video session management capability. The video session management capability enables management of potential and/or established video sessions of mobile devices of a cellular sector. For example, the video session management capability may support dynamic changes to the transmission bit rates of established video sessions in a cellular sector (e.g., decreasing the transmission bit rate(s) of one or more mobile device in order to accommodate a new video session requested by another mobile device, increasing the transmission bit rate(s) of one or more mobile devices where additional capacity on the wireless uplink may be used to support such a rate increase, and the like, as well as various combinations thereof). It is noted that the video session management capability may support various other features and functions.

Although primarily depicted and described herein with respect to use of various embodiments of the wireless uplink control capability within a specific type of wireless communication network, it will be appreciated that various embodiments of the wireless uplink control capability may be used within any suitable type(s) of wireless communication network(s).

Figure 1:
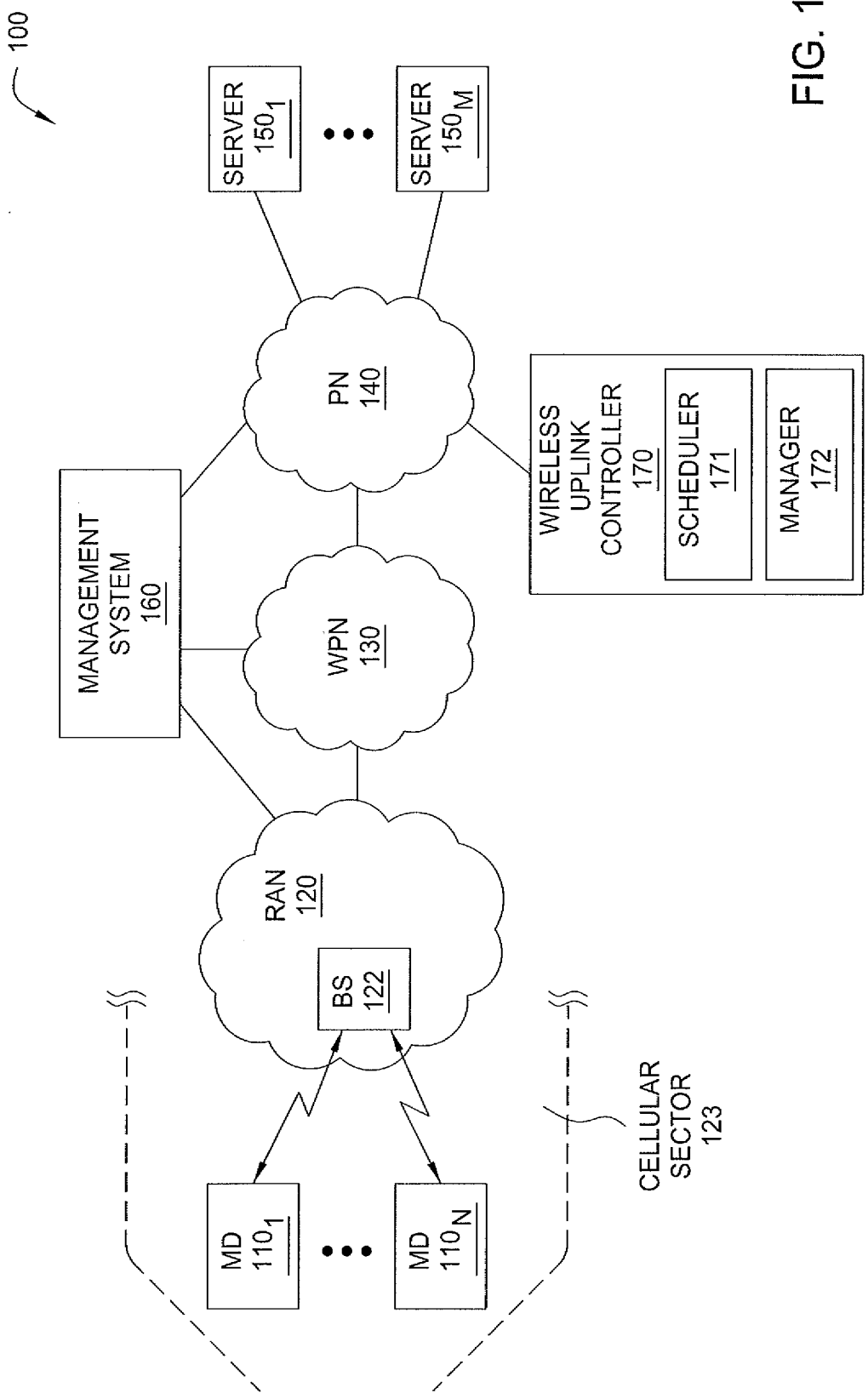
FIG. 1 depicts an exemplary wireless communication system, including a Wireless Uplink Controller configured to provide a wireless uplink control capability.

FIG. 1 depicts an exemplary wireless communication system, including a Wireless Uplink Controller configured to provide a wireless uplink control capability.

The exemplary wireless communication system 100 includes a plurality of mobile devices (MDs) $110_1$-$110_N$ (collectively, MDs 110), a Radio Access Network (RAN) 120, a Wireless Packet Network (WPN) 130, a Packet Network (PN) 140, a plurality of servers $150_1$-$150_M$ (collectively, servers 150), a Management System 160, and a Wireless Uplink Controller 170.

The MDs 110 are mobile devices configured for communicating with RAN 120 wirelessly. The MDs 110 may provide control information and content via a wireless uplink to RAN 120 and may receive control information and content via a wireless downlink from RAN 120.

The MDs 110 are configured to operate as sources of content streams to be propagated via a wireless uplink to the RAN 120 (denoted herein as wireless uplink content streams). In general, a wireless uplink content stream may be a video stream (without audio), a multimedia stream (e.g., video and one or more other types of content, such as audio, text, and so forth), and the like. In this sense, wireless uplink content streams also may be referred to herein as wireless uplink video streams where the content streams at least include a video portion (and, as noted above, also may include one or more other types of content).

The MDs 110 are configured to negotiate for scheduling of uplink video sessions via which the MDs 110 may propagate video content via a wireless uplink to RAN 120. For example, the MDs 110 are configured to send uplink video session scheduling requests for requesting scheduling of uplink video sessions. Similarly, the MDs 110 also are configured to receive uplink video session scheduling responses in response to the uplink video session scheduling requests, where the uplink video session scheduling responses include uplink video session scheduling information configured for use by the MDs in establishing uplink video sessions for propagation of video content via the wireless uplink (e.g., a time at which the video session may begin, a maximum transmission bit rate allocation for the video session).

The MDs 110 are configured to capture content and stream captured content via the wireless uplink to RAN 120.

The MDs 110 are configured to support video content capture and streaming mechanisms. For example, an MD 110 may support standard definition and/or high definition video recording. For example, an MD 110 may include one or more video cameras (e.g., a front-facing camera at lower resolution to support video chatting, a rear-facing camera at higher resolution for other videos, and the like, as well as various combinations thereof). For example, an MD 110 may include one or more different video codecs (e.g., H.263, H.264 Advanced Video Coding (AVC) (Motion Picture Experts Group (MPEG)-4—Part 10), H.264 AVC—Scalable Video Coding (SVC), Google VP8, and the like, as well as various combinations thereof). In one embodiment, an MD 110 is configured to support adaptive bit rate encoding/streaming, which provides variable bit rate encoding/streaming in real or near real time dependent on the bandwidth and/or processor capacity of the MD 110 (e.g., where MD 110 is configured to support multiple encoding bit rates and encode at requested ones of the supported encoding bit rates based on information such as radio conditions, end-to-end conditions, and the like). For example, an MD 110 may support various protocols associated with streaming of video (e.g., Real-Time Transport Protocol (RTP)/Real-Time Transport Control Protocol (RTCP) as defined in RFC 3550, Extended RTP Profile for RTCP-Based Feedback denoted as RTP Audio-Visual Profile with Feedback (RTP/AVPF) as defined in RFC 4585, Codec Control Messages in the RTP AVPF as defined in RFC 5104, Reduced-Size RTCP as defined in RFC 5506, and the like). The MD 110s may support various other video capture and/or video streaming capabilities. The MDs 110 also may be referred to herein as video senders supporting video capture and streaming capabilities.

The MDs 110 may be configured to support audio content capture and streaming mechanisms. For example, an MD 110 may include one or more microphones (e.g., for use in video chat, for use in narration of videos, and the like). For example, an MD 110 may include one or more audio codecs (e.g., AAC (MPEG-4 Part 3), Adaptive Multi-Rate (AMR), Moving Picture Experts Group Layer-3 (MP3), and the like, as well as various combinations thereof).

The MDs 110 may be configured to support various other functions associated with propagation of video content (e.g., sending of video session quality statistics associated with video sessions, receiving and processing of video session management information, and the like, as well as various combinations thereof).

In one embodiment, the MDs 110 may include various feature sets for content capture, which may be supported by various associated Software Development Kit (SDK) Application Programming Interfaces (APIs).

In at least some embodiments, at least a portion of the MDs 110 also may be configured to operate as receivers of content streams provided from other devices. In this sense, an MD 110 may be a content sender and, optionally, also may be a content receiver. Additionally, it is noted that, in at least some embodiments, one or more of the content receivers of a wireless uplink content stream provided by one of the MDs 110 may be any type of device(s) which may connect to PN 140 (e.g., mobile devices, stationary devices, and the like, as well as various combinations thereof).

For example, MDs 110 may be smart phones, tablet computers, laptop computers, or any other types of devices capable of capturing video and propagating the captured video via a wireless uplink of a wireless network.

The RAN 120 may be any suitable type of radio access network, which may be implemented differently for different types of wireless technologies. The RAN 120 provides an interface between MDs 110 and WPN 130. The RAN 120 includes a base station (BS) 122 supporting an associated cellular sector 123, where MDs 110 that are located within the cellular sector 123 are able to access RAN 120 via the BS 122 of RAN 120. In general, an MD 110 communicates with BS 122 via a wireless communication link which, as noted above, generally includes an uplink portion via which the MD 110 transmits information to BS 122 and a downlink portion via which the BS 122 transmits information to the MD 110. Although depicted and described herein as including a single base station (for purposes of clarity), it will be appreciated that RAN 120 may include any suitable number of base stations supporting any suitable number of associated cellular sectors.

The WPN 130 may be any suitable type of wireless packet network which, similar to RAN 120, may be implemented differently for different types of wireless technologies. The WPN 130 provides an interface between RAN 120 and PN 140. For example, in a Third Generation UMTS network, WPN 130 may include elements such as Serving General Packet Radio Service (GPRS) Support Nodes (SGSNs), Gateway GPRS Support Nodes (GGSNs), and the like. For example, in a Long Term Evolution (LTE) network, WPN 130 may include elements such as Serving Gateways (SGWs), Packet Data Network (PDN) Gateways (PGWs), Mobility Management Entities (MMES), a Policy and Charging Rules Function (PCRF), and the like.

The PN 140 may be any suitable type of packet network, such as a public packet network (e.g., the Internet), a private packet network, and the like. The PN 140 may include and/or provide communication to a number of network elements configured for providing various functions of the wireless uplink control capability. In one embodiment, for example, PN 140 supports communications for servers 150, Management System 160, and Wireless Uplink Controller 170.

The servers 150 may be any suitable types of servers, such as Web Servers (WSs), Application Servers (ASs), and the like. The servers 150 may include any servers which may be accessed by MDs 110, including servers which may be accessed unrelated to videos being provided by MDs 110, servers which may be accessed within the context of videos being provided by MDs 110 (e.g., servers hosting social networking sites and/or other types of sites to which MDs 110 may provide streaming video), and the like, as well as various combinations thereof.

The Management System 160 may be any suitable type of management system, providing various management functions for one or more of RAN 120, WPN 130, and PN 140. In one embodiment, for example, Management System 160 may provide one or more of network and/or service provisioning functions, network monitoring functions, and the like, as well as various combinations thereof. In one embodiment, Management System 160 is configured to support and/or provide one or more functions of the wireless uplink control capability.

The Wireless Uplink Controller 170 is configured to provide various functions of the wireless uplink control capability. In one embodiment, Wireless Uplink Controller includes a Scheduler 171 configured to provide various functions of the video session scheduling capability. In one embodiment, Wireless Uplink Controller includes a Manager 172 configured to provide various functions of the video session management capability. It is noted that, in at least some embodiments, Scheduler 171 and Manager 172 may cooperate to provide various functions of the wireless uplink control capability. The operation of Wireless Uplink Controller 170 may be better understood by first considering various aspects of a wireless ecosystem such as exemplary wireless communication network 100 of FIG. 1 and various elements involved in the process of creating and delivering video in a wireless ecosystem such as exemplary wireless communication network 100 of FIG. 1.

In general, a number of elements and/or capabilities may be involved in the process of creating and delivering video in a wireless ecosystem such as exemplary wireless communication network 100 of FIG. 1. For example, such elements and/or capabilities may include, but are not limited to, one or more of: (1) wireless access network capabilities (e.g., bandwidth, quality of service (QoS), call admission control (CAC), and the like), (2) applications (e.g., e.g., video chat, live video for broadcast, upload live or in background to a web portal, and the like) and protocols (e.g., Real-Time Transport Protocol (RTP)/Real-Time Transport Control Protocol (RTCP), Adaptive Hypertext Transfer Protocol (HTTP), File Transfer Protocol (FTP), and the like), (3) codecs and associated encapsulation/decapsulation capabilities (e.g. H.263, H.264/AVC, SVC, VP8*, Microsoft 115 Smooth Streaming, Hypertext Markup Language 5 (HTML5), and the like), and (4) mobile device capabilities (e.g., numbers and types of cameras, camera resolution, encoding capabilities, processing power, and the like). Additional descriptions of such capabilities are provided herein.

In general, exemplary wireless communication network 100 of FIG. 1 provides a generic architecture for a wireless access network. In at least some embodiments, the following assumptions may be made for exemplary wireless communication network 100 of FIG. 1: (1) end-to-end support for Internet Protocol version 4 (IPv4) and/or version 6 (IPv6) is available; (2) treatment of flows at different QoS levels is supported or at least available; (3) a bottleneck may occur at the wireless link (while wireless link bandwidth varies across technologies and generally tends to improve with each generation, the bandwidth requirement for video is quite significant, over 8 Mbps for high definition (HD) video, and thus may continue to present an issue for quite some time); (4) the architecture, in many ways, may be bound by conformance to standards which are more or less closed from the MDs 110 to the gateway on the edge of WPN 130 (e.g., a GGSN, PGW, or other similar gateway between WPN 130 and PN 140); and (5) call admission control (CAC) is supported such that a service is admitted if the system decides that adequate resources are available to accommodate the end-to-end flows produced by the service (it is noted that this is typically applied to guaranteed bit rate (GBR) services, as opposed to best effort (BE) services); and (6) information from RAN 120, WPN 130, and/or PN 140 may be leveraged in order to make intelligent decisions at the application level. It is noted that one or more of these assumptions may be modified or eliminated as needed and/or desired. It is further noted that various other assumptions may be relied upon in providing various embodiments of the wireless uplink control capability.

In exemplary wireless communication network 100 of FIG. 1, there are many scenarios in which video may be transmitted over a wireless uplink from a MD 110 to RAN 120.

A first example of such a scenario is video chat, which may include a bidirectional video session with a one-to-one relationship, a one-to-many relationship, or even a many-tomany relationship for video conferences. For example, some video chat applications include iPhone FaceTime, Qik Chat, and the like.

A second example of such a scenario is video sharing (which may be considered to be a variation of video chat), in which a unidirectional video session accompanies an audio call (e.g., in this case, the video sender is perhaps describing a scene and the video does not need to be synchronized with the voice).

A third example of such a scenario is video broadcast, which provides a unidirectional, one-to-many distribution of video. In one embodiment, the video is streamed from the MD 110 to a central server that receives the video from the MD 110 and then transmits the video via one or more other transmission mediums. As an example, a news reporter may record video via an MD 110 (and stream the video from the MD 110 to a central server of a control room of the broadcaster (e.g., using a video camera that is equipped with cellular communication capabilities and/or other suitable capabilities), such that the central server can modify the video as needed (e.g., with banners, logos, and the like) and then broadcast it in the usual manner to viewers. In this example, it is noted that the MD 110 can replace the expensive and cumbersome satellite truck that would otherwise be required in order for the reporter to provide such a report. It is noted that this is merely one example of use of the video broadcast scenario, and that video broadcast may be used in various other ways and for various other purposes.

A fourth example of such a scenario is video multicast, which provides a unidirectional one-to-many distribution of video which is sent directly to viewers as a multicast stream and/or multiple unicast streams. In general, some types of applications that may utilize this type of service may include emergency services (e.g., providing video feeds from the scene of an accident to emergency management personnel, doctors at nearby hospitals, and the like), resort area broadcasts for live consumption, reality television from remote locations, and the like.

A fifth example of such a scenario is video-to-cloud, in which video is streamed from an MD 110 to a network destination (e.g., a website or other location in the cloud) so that the video can be viewed from the network destination in real time as it arrives and/or later if it is archived. In one embodiment, potential viewers of the video may be notified of the availability of the video (e.g., an indication that a "live" video is in progress and/or will be available in the future). In one embodiment, potential viewers of the video may be notified of the availability of the video in any suitable manner (e.g., via a Short Message Service (SMS) message, email, and the like). In one embodiment, notifications to potential viewers regarding availability of a video include an indication as to the manner in which the potential viewers may access the video (e.g., using a Uniform Resource Locator (URL) or any other suitable mechanism). For example, some video-to-cloud applications include Qik, Knocking Live, and YouTube.

It is noted that the foregoing scenarios are exemplary and that various other scenarios may utilize streaming of video via the wireless uplink between MDs 110 and RAN 120.

In general, each of the exemplary video transmission scenarios may have an associated set of recommendations or requirements for its sufficient or optimal utility. For example, such recommendations or requirements may include one or more of video quality, video delivery mode, video application priority, video application protocol, and the like, as well as various combinations thereof. In general, video quality corresponds to a combination of the spatial, temporal, and/or quantization parameters that constitute the quality of the video that is viewed (which ultimately translates into the transmission bit rate of the video and/or bandwidth required to support the video). In general, video delivery mode corresponds to the timing of the start of the video. In one embodiment, three video delivery modes are supported as follows: (1) real-time (RT), a live streaming service, which indicates that delivery of the video will be in real-time (e.g., start of delivery of the video is to begin immediately or nearly immediately); (2) near real-time (NRT), also a live streaming service, which indicates that start of delivery of the video can be delayed; and (3) background (BG), which indicates background delivery of video (e.g., such as a file transfer or other type of video in which delivery may be delayed for any suitable length of time). In general, video application priority of a video application corresponds to priority of that video application, relative to other video applications, to provide a relatively high quality of experience (QoE). In general, the video application protocol of a video application corresponds to a class of protocol used to enable the video application (e.g., where streaming video may utilize RTP or HTTP, where as background video may utilize a File Transfer Protocol (FTP) service. It is noted that other recommendations and/or requirements may be supported within this context.

In many video applications, there are three functions typically involved in establishing and maintaining a connection for supporting streaming of video, including (1) a mechanism to create a connection, which may include a mechanism to allow video senders to notify video receivers that a video is available, and to allow the video receivers to be able to accept invitations from video senders; (2) call admission control (CAC) functions; and (3) providing QoS treatment for video packets transporting video from video senders to video receivers. These functions are described in additional detail below. It is noted that, once video applications begin taking advantage of CAC and differentiated QoS from the Network Service Provider (NSP), over-the-top (OTT) applications will be at a disadvantage, especially at times of congestion, since they will only receive Best Effort (BE) service.

In general, for at least some video applications, a video session is created to support transmission of video within the context of the video application. For video chat applications, for example, the video session creation mechanism may be similar to establishment of a Voice over Internet Protocol (VoIP) call, of which many variations are possible. For example, some video applications (e.g., Skype and others) have proprietary implementations, whereas other video applications (e.g., Apple's FaceTime and others) have implementations based on standards (e.g., standards such as H.264, Advanced Audio Coding (AAC), Session Initiation Protocol (SIP), RTP, Secure Real-Time Transport Protocol (SRTP), and the like). For example, assuming use of a standards-based approach such as that used by Apple FaceTime, a basic message flow to establish a video session may include the following steps: (1) an initiating client initiates, with a known server (e.g., in this example, an Apple server in the network), a request to establish a video connection, where the request may be in the form of a SIP invite; (2) the SIP invite is provided from the initiating client to a viewing client (where an assumption is made that all parties have already registered); (3) following receipt of a SIP OK message from the viewing client, messaging is exchanged to negotiate audio/video parameters for the video connection; and (4) following establishment of the video session, video/audio are exchanged between the two participants over RTP (where it is noted that the server is not necessarily in the video/audio path). It is noted that this general message flow is merely exemplary. The use of this general process, as well as variations of this general process, may be better understood by way of reference to descriptions of treatment of this process by the 3rd Generation Partnership Project (3GPP) standards. It is further noted that any other suitable process may be used to establish a video session for a video application (e.g., different variations of this process may be used for other video chat applications as well as for other types of video applications, other types of processes may be used, and the like, as well as various combinations thereof).

In general, for at least some video applications, unidirectional video sessions may be established to support transmission of video within the context of the video applications, and the unidirectional video sessions can differ depending upon the type(s) of application(s) being supported. This is described below with respect to some exemplary video applications which use unidirectional video sessions.

For video share applications, for example, establishment of the unidirectional video session may be performed in a manner similar to that of video chat applications; however, in video share applications the video may lag behind the voice and, thus, the QoS requirements for video transport in video share applications are generally less stringent than for video chat applications.

For video broadcast for broadcast television applications, for example, implementations to establish and maintain a unidirectional video session may be proprietary to suit the specific application. In many cases, low latency delivery of video is critical (e.g., where the audio exchange between the news anchor and reporter must match what is being viewed). As such, in many cases, video may be streamed using the User Datagram Protocol (UDP) rather than the Transmission Control Protocol (TCP) connection as there is no point in trying to retrieve lost video frames.

For video multicast/broadcast for enterprise applications, for example, in which there is not necessarily an application in the architecture which can facilitate delivery of video, infrastructure within the NSP network may be used to enable an IP multicast/broadcast to potential viewers. This scenario may have different latency requirements for different types of such applications (e.g., where low latency streaming is required for emergency services applications, whereas "resort" type applications may be able to tolerate delays in the actual start of the video streaming).

For video-to-cloud for consumer sites applications, for example, the video may or may not need to be viewed live, depending on the specific application. In this case, if the video is not time-sensitive, then tens of seconds of delay, minutes of delay, or even longer, may be acceptable. In many cases, the sites may advertise the video feeds as being live and, thus, the associated video applications are generally designed to provide the best possible service given the available bandwidth. As a result, many such applications employ techniques similar to those of the broadcast television model, albeit at a lower quality level requiring less bandwidth.

In general, various other types of video sessions may be established for these and/or other types of video applications. As described herein, such video sessions may be supported via a wireless uplink of a wireless network and, thus, also may be referred to herein as uplink video sessions. As further described herein, such uplink video sessions may be controlled using various embodiments of the wireless uplink control capability.

As described above, Wireless Uplink Controller 170 is configured to provide various functions of the wireless uplink control capability. In one embodiment, a video session scheduling capability is provided for scheduling of video transmissions by mobile devices of a cellular sector (e.g., scheduling one or more parameters associated with video transmissions by mobile devices via a wireless uplink of the cellular sector, such as the times at which the mobile devices may begin video transmissions via the wireless uplink, the transmission bit rate allocations for video transmissions via the wireless uplink, and the like). The video session scheduling capability, by enabling video applications of mobile devices of a cellular sector to reserve/secure adequate bandwidth on the wireless uplink, improves the reliability of video applications sending video via the wireless uplink of the cellular sector. In one embodiment, various functions of the video session scheduling capability are provided by the Scheduler 171 depicted and described with respect to FIG. 1.

The Scheduler 171 may utilize various functions of one or more of the components of exemplary communication system 100 as depicted and described herein. For example, Scheduler 171 may receive uplink resource information from a management system (e.g., Management System 160 and/or any other suitable source of such information). For example, Scheduler 171 may receive uplink video session requests from MDs 110. For example, Scheduler 171 may receive mobile device location information from RAN 120 and/or WPN 130, such that Scheduler 171 is able to determine, for each MD 110, the cellular sector to which the MD 110 is connected (illustratively, cellular sector 123 for MDs $110_1$-$110_N$). For example, Scheduler 171 may communicate with a Call Admission Control (CAC) function configured to determine whether a request for resources can be met. For example, Scheduler 171 may receive, from RAN 120 and/or WPN 130, triggers indicative of presence of resource congestion and, similarly, easing of resource congestion. In one embodiment, such triggers may be provided in the form of Explicit Congestion Notifications (ECNs) from RAN 120 and/or WPN 130. The Scheduler 171 may utilize various other functions of one or more of the components of exemplary communication system 100.

The Scheduler 171 is configured to manage scheduling of uplink video sessions for the cellular sector 123.

The Scheduler 171 is configured to receive requests for uplink video sessions of MDs 110 of cellular sector 123, receive information for use in scheduling uplink video sessions supported via the wireless uplink in the cellular sector 123, determine scheduling of uplink video sessions via the wireless uplink in the cellular sector 123 based on the received information for use in scheduling uplink video sessions supported via the wireless uplink in the cellular sector 123, and provide uplink video session responses in response to the uplink video session requests of MDs 110 of cellular sector 123.

The Scheduler 171 receives requests for uplink video sessions of MDs 110 of cellular sector 123. In general, a request by an MD 110 for an uplink video session includes information associated with the uplink video session request (e.g., a requested transmission bit rate for the uplink video session, an indication of a delivery mode associated with the uplink video session, a type of application with which the uplink video session is associated, and the like, as well as various combinations thereof). The Scheduler 171 may receive the request for uplink video sessions from the MDs 110 and/or may receive the requests for uplink video sessions from one or more CAC functions of the network (e.g., which may operate to receive uplink video session requests of MDs 110 and route them to Scheduler 171 and/or receive uplink video session requests of MDs 110 and send appropriate corresponding uplink video session requests to Scheduler 171 on behalf of the MDs 110). In any event, Scheduler 171 receives indications of uplink video sessions requested by MDs 110 of the cellular sector 123.

The Scheduler 171 receives information for use in scheduling uplink video sessions to be supported via the wireless uplink in the cellular sector 123, which may include uplink resource information indicative of an amount of wireless uplink resources available for supporting uplink video sessions within the cellular sector 123, video session request information associated with requests by MDs 110 for uplink video sessions, MD status information of MDs 110, cellular sector status information of cellular sector 123, network status information (e.g., of one or more of RAN 120, WPN 130, PN 140, and the like), service provider policies, and the like, as well as various combinations thereof.

The Scheduler 171 receives information indicative of an amount of wireless uplink resources (also denoted herein as a budget of wireless uplink resources) allocated within the cellular sector 123 for supporting uplink video sessions within the cellular sector 123. The information may be represented using one or more of a current resource allocation of cellular sector 123, a maximum resource allocation of cellular sector 123, an available resources parameter of cellular sector 123, and the like, as well as various combinations thereof.

The resources of the cellular sector 123 may be any suitable resources of a cellular sector in a cellular network. In one embodiment, for example, the resources of the cellular sector 123 are Physical Resource Blocks (PRBs) on the air interface supported by the BS 122 of the cellular sector 123 (in which case the budget of resources is denoted as PRB_ALLOCATION). In general, a certain number of PRBs are available within each time slice within the cellular sector 123 during which wireless uplink transmissions from the MDs 110 may take place. The use of PRBs, or any similar types of resources, as a basis for scheduling of uplink video sessions is advantageous because, for each MD 110, the number of PRBs allocated to the MD 110 translates into the total transmission bit rate for the MD 110. This is primarily due to the fact that different MDs 110 may have different signal-to-noise ratios (SNRs) with the BS 122, which translate into the Modulation and Coding Schemes (MCSs) that the respective MDs 110 employ, which in turn determines how many bits of information may be transmitted by the respective MDs 110 in a single PRB (e.g., in general, MDs 110 located closer to BS 122 will be able to transmit more bits within a given PRB than MDs 110 located farther from BS 122).

The budget of wireless uplink resources of the cellular sector 123 may be received from any suitable source of such information. In one embodiment, for example, the budget of wireless uplink resources of the cellular sector 123 may be received from Management System 160 (e.g., from an OAM system or any other suitable type of system).

The Scheduler 171 receives video session request information associated with a request by an MD 110 to establish an uplink video session for transmission of video content from the MD 110 via a wireless uplink in the cellular sector 123. The video session request information may be received as part of the uplink video session request and/or obtained in response to receiving the uplink video session request. The video session request information may include one or more of transmission bit rate request information (e.g., a requested transmission bit rate requested by the MD 110, a minimum transmission bit rate acceptable to the MD 110, and the like), a type of video stream to be provided via the uplink video session, a delivery mode for the uplink video session (e.g., RT, NRT, or BG), a timeout delay value indicative of a maximum time for which start of the uplink video session may be delayed, information associated with a Service Level Agreement (SLA) of a user of the MD 110, device capability information associated with the MD 110, a list of one or more intended video receivers for the uplink video session, device capability information associated with one or more intended video receivers for the uplink video session, one or more negotiability parameters indicative of extent of negotiability of one or more of the types of information associated with the request by the MD 110 to establish the uplink video session, and the like, as well as various combinations thereof.

The Scheduler 171 may receive additional types of information which may be used to determine scheduling of the uplink video session via the wireless uplink in the cellular sector 123.

In one embodiment, for example, the Scheduler 171 may receive MD status information of MDs 110 (e.g., information indicative of the conditions of the signal strength and/or MCSs of the MDs 110, information indicative of the battery power status of the MDs 110, and the like) for use in scheduling uplink video sessions to be supported via the wireless uplink in cellular sector 123. In one embodiment, for example, the Scheduler 171 is configured to weight MDs 110 by coupling the bandwidth requirements of the MDs 110 (driven by the desired quality of the video) with the MCSs of the MDs 110 (which dictates the efficiency with which the respective MDs 110 can transmit data over the wireless uplink). In some instances, the Scheduler 171 gives precedence to MDs 110 with high video quality requirements that have excellent signal strength. In some instances, the Scheduler 171 gives precedence to MDs 110 with low video quality requirements that have less than optimal signal strength.

In one embodiment, for example, the Scheduler 171 may receive cellular sector status information of cellular sector 123 (e.g., cell loading of the cellular sector 123, ECNs received from data paths associated with cellular sector 123, and the like) for use in scheduling uplink video sessions to be supported via the wireless uplink in cellular sector 123.

In one embodiment, for example, the Scheduler 171 may receive network status information of one or more portions of RAN 120, WPN 130, and/or PN 140 (e.g., loading of the network portions, ECNs received from data paths associated with the network portions, and the like) for use in scheduling uplink video sessions to be supported via the wireless uplink in cellular sector 123.

In one embodiment, for example, the Scheduler 171 may receive service provider policies of the service provider for use in scheduling uplink video sessions to be supported via the wireless uplink in cellular sector 123. The Scheduler 171 may receive any other suitable types of information which may be used in scheduling uplink video sessions to be supported via the wireless uplink in cellular sector 123.

The Scheduler 171 determines scheduling of uplink video sessions via the wireless uplink in cellular sector 123 based on received information for use in scheduling uplink video sessions supported via the wireless uplink in the cellular sector 123.

In one embodiment, the Scheduler 171 determines scheduling of the uplink video session via the wireless uplink in the cellular sector 123 by determining a time at which the uplink video session may begin and determining a bit rate allocation for the uplink video session.

In one embodiment, the Scheduler 171 determines scheduling of the uplink video session via the wireless uplink in the cellular sector 123 based on uplink resource information indicative of an amount of wireless uplink resources available within the cellular sector 123 and video session request information associated with the uplink video session request (and, optionally, also based on one or more other types of information that may be considered when determining scheduling of the uplink video session via the wireless uplink in the cellular sector 123).

In one embodiment, the Scheduler 171 is configured to determine scheduling of uplink video sessions based, at least in part, on the delivery mode of the uplink video sessions being scheduled (e.g., where the delivery mode of the uplink video session may be used to determine the time at which the video session may begin). In one embodiment, as noted hereinabove, three possible delivery modes for video sessions include: (1) RT, which indicates live video having strict latency and delay requirements, but for which bandwidth usage can be variable; (2) NRT, which indicates video that is buffered locally for RT delivery (e.g., within a relatively short period of time, which may vary based on the type of video, the buffering capabilities of the MD 110, and the like), which allows for less strict latency and delay constraints and, thus, greater flexibility for delivery; and (3) BG, which indicates that the video may be provided at any time.

Within the context of delivery mode, it is noted that the Scheduler 171 may be configured to account for the delivery mode as determined based on the type of application and, optionally, the delivery mode as requested by the MD 110 (where the MD 110 may request a delivery mode for a video session that, although desired, is not necessary for the type of application of the requested video session).

As described hereinabove, a video session may or may not require RT treatment. For example, a "video chat" application (e.g., one-to-one or conference call) has a delivery mode of RT. For example, in a video share application, while the voice may be RT, the video does not necessarily need to be synchronized with the voice conversation and, thus, may have an associated delivery mode of NRT. For example, if the video session is a one-to-many scenario with no interaction, depending upon the urgency of the video, the video may be transmitted using an NRT delivery mode after any suitable delay. For example, various other video applications may deem it acceptable to transmit video in the background (e.g., for providing the video to a website, for providing off-peak distribution of the video, and the like). In at least one embodiment, Scheduler 171 is configured to use the requirements of the delivery mode for the video session for determining scheduling of the video session request.

Additionally, as noted above, it is possible that the MD 110 may request a delivery mode that is not necessary for the type of application of the requested video session (e.g., where the MD 110 requests RT treatment of video from a video share application which could be streamed without synchronization with the voice conversation, where the MD 110 requests NRT treatment of a video session that could be handled using the BG delivery mode, and the like). In at least one embodiment, Scheduler 171 is configured to use the delivery mode requested by the MD 110 for the video session for determining scheduling of the video session request.

Thus, with such an understanding of the different properties of such delivery modes, video sessions can be scheduled more intelligently without impacting the perceived QoE of the users.

The Scheduler 171 maintains a set of queues for managing the uplink video session requests of the cellular sector 123. In one such embodiment, the set of queues for a cellular sector includes a NRT queue used for queuing NRT uplink video session requests of MDs 110 of the cellular sector 123 and a BG queue used for queuing BG uplink video session requests of MDs 110 of the cellular sector 123. It is noted that, where other types of delivery modes are supported, Scheduler 171 may be configured to support the appropriate types of queues for the delivery modes.

In one embodiment, Scheduler 171 is configured to use various processes to determine scheduling of an uplink video session via the wireless uplink in the cellular sector 123. The processes include a VideoSessionRequest process, a VideoSessionEnded process, a VideoSessionChanged process, a SystemResourceChange process, an nrtTimeout process, an nrtExitFromSector process, an increaseSectorVideos process, an insertSessionRequest process, and a reduceSectorVideos process. For purposes of clarity in describing such processes, the processes are primarily described within the context of an embodiment in which Scheduler 171 receives uplink resource information indicative of an amount of wireless uplink resources available for supporting uplink video sessions within the cellular sector 123, receives video session request information associated with a request by a MD 110 to establish an uplink video session for transmission of video content from the MD 110 via the wireless uplink in the cellular sector 123 (e.g., including requested transmission bit rate and associated delivery mode), and determines, using the uplink resource information indicative of an amount of wireless uplink resources available within the cellular sector 123 and the video session request information associated with the uplink video session request, scheduling of the uplink video session via the wireless uplink in the cellular sector 123. It is noted that, although largely omitted from the description of the processes for purposes of clarity, the Scheduler 171 also may receive one or more additional types of information which may be used to determine scheduling of the video session via the wireless uplink in the cellular sector 123 within the context of these processes.

In one embodiment, Scheduler 171 is configured to operate on the following events as they arrive:

(1) Video Session Request:

In one embodiment, Scheduler 171 is configured to execute the VideoSessionRequest process when a MD 110 sends a video session request to the Scheduler 171 to reserve resources for a video session. The video session request includes video session request information configured for use by the Scheduler 171 in determining scheduling of the video session within the cellular sector with which the MD 110 is associated. For example, the video session request information may include one or more of a transmission bit rate request of the MD 110 (denoted as TxMAX), a minimum transmission bit rate acceptable to the MD 110 (denoted as TxMIN), the intended video receiver(s) for the video session, the delivery mode for the video session (e.g., RT, NRT, BG), a timeout delay indicative of the maximum time for which start of the video session may be delayed (denoted as DELAY), and the like, as well as various combinations thereof. For example, the video session request information also may include a negotiability parameter(s) indicative of the extent of negotiability of one or more of the other parameters, where any suitable numbers and types of negotiability parameter values may be supported (e.g., HARD (which indicates non-negotiability of the associated parameter(s)) and SOFT (which indicates that the parameter(s) is negotiable and, optionally, the extent of negotiability of the parameter(s)).

If the delivery mode of the video session request is RT, the Scheduler 171 negotiates a current bit rate (denoted as $TxCBR_{bitrate}$), such that the following two conditions are satisfied: (1) CURRENT_PRB_ALLOCATION+ $TxCBR_{PRB}$<PRB_ALLOCATION and (2) TxMAX≤$TxCBR_{bitrate}$≥TxMIN. In this case, if the Scheduler 171 determines that the cellular sector has enough resources for the requested video session, the Scheduler 171: (1) adds $TxCBR_{PRB}$ to the current PRB allocation as follows: CURRENT_PRB_ALLOCATION=CURRENT_PRB_ALLOCATION+$TxCBR_{pRB}$; and (2) responds to the MD 110 with the value of $TxCBR_{bitrate}$, such that the MD 110 may commence the video session immediately. In this case, if the Scheduler 171 determines that the cellular sector does not have enough resources for the requested video session and the RT mode is not indicated as being a SOFT constraint, Scheduler 171 executes the reduceSectorVideos process in order to try to make room for the requested video session by reducing other active sessions (and, if successful, (a) adds $TxCBR_{PRB}$ to the current PRB allocation as follows: CURRENT_PRB_ALLOCATION=CURRENT_PRB_ALLOCATION+$TxCBP_{PRB}$; and (b) responds to the MD 110 with the value of $TxCBR_{bitrate}$, such that the MD 110 may commence the video session immediately). In this case, if the Scheduler 171 determines that the cellular sector does not have enough resources for the requested video session and the RT mode is indicated as being a SOFT constraint, Scheduler 171 executes the insertSessionRequest process in order to insert the video session request into the NRT queue for the cellular sector, otherwise the video session request cannot be satisfied.

If the delivery mode of the video session request is NRT or BG, the Scheduler 171 determines whether it is possible to satisfy the requirements of the video session request immediately (e.g., by determining whether the following condition is satisfied: CURRENT_PRB_ALLOCATION+$TxMIN_{PRB}$<PRB_ALLOCATION). In this case, if it is possible to satisfy the requirements of the video session request immediately, Scheduler 171 re-executes the VideoSessionRequest process for the video session request while treating the video session request as having a delivery mode of RT. In this case, if it is not possible to satisfy the requirements of the video session request immediately, the Scheduler 171 executes the insertSessionRequest process in order to insert the video session request into the NRT queue or the BG queue of the cellular sector 123 as appropriate.

(2) Video Session Ended:

In one embodiment, Scheduler 171 is configured to execute the VideoSessionEnded process when a video session has ended or moved from the cellular sector 123 to a new cellular sector, thereby freeing up resources of the cellular sector 123 to support other video sessions. The Scheduler 171 updates the current allocation of PRBs within the cellular sector 123 by subtracting, from the current allocation of PRBs within the cellular sector 123, the amount of PRBs ($TxCBR_{PRB}$) corresponding to the transmission bit rate ($TxCBR_{bitrate}$) that was allocated to the terminated video session, as follows: CURRENT_PRB_ALLOCATION=CURRENT_PRB_ALLOCATION−$TxCBR_{PRB}$. The Scheduler 171 executes the increaseSectorVideos process in order to reallocate available resources of the cellular sector 123 to other video sessions.

(3) Video Session Changed:

In one embodiment, Scheduler 171 is configured to execute the VideoSessionChanged process when a video session has reduced its allocation of PRBs within the cellular sector 123 (e.g., its value of $TxCBR_{PRB}$ or $TxMAX_{PRB}$), thereby freeing up resources of the cellular sector 123 to support other video sessions. The Scheduler 171 updates the current allocation of PRBs within the cellular sector 123 by subtracting, from the current allocation of PRBs within the cellular sector 123, the amount of bit rate released from the modified video session, as follows: CURRENT_PRB_ALLOCATION= CURRENT_PRB_ALLOCATION−($TxCBR_{PRB-OLD}$−$TxCBR_{PRB-NEW}$). The Scheduler 171 then executes the increaseSectorVideos process in order to reallocate available resources of the cellular sector to other video sessions.

(4) System Resource Changed:

In one embodiment, Scheduler 171 is configured to execute the SystemResourceChange process at a specific time or when an associated timer expires. This may be used, for example, where it is necessary or desirable to initiate a resource change at a certain time. For example, the Scheduler 171 may be configured to initiate an increase of system resources at a specific time (e.g., at 5:00 PM in order to ensure adequate wireless uplink resources for a premium user such as a network news anchor providing a report via transmission of video via a wireless uplink). For example, the Scheduler 171 may be configured to initiate a decrease of system resources following expiration of a timer. The Scheduler 171 may use the SystemResourceChange process to change the available wireless uplink in various other ways.

In one embodiment, Scheduler 171 is configured to execute the SystemResourceChange process in response to an indication of a change in the available resources of the cellular sector 123.

In one embodiment, in response to an indication of a reduction in the maximum available resources of the cellular sector 123 (i.e., a decrease in the PRB_ALLOCATION value), Scheduler 171 executes the reduceSectorVideos process. In one embodiment, Scheduler 171 executes the reduceSectorVideos process at a specific time or when an associated timer expires. It is noted that this change may be due to any number of events or conditions, such as due to a change in the load on the cellular sector 123 or a change in the resource budget of the cellular sector 123. It is further noted that the specific time may be any suitable time and, similarly, that the timer may be set to any suitable value equal to or greater than zero (where zero would indicate that the reduceSectorVideos process would be executed immediately). The Scheduler 171 then sets the cellSector_State parameter to REFUSE, in order to refuse any new video session within the cellular sector 123 until the current allocation of resources in the cellular sector 123 drops below the new maximum available resources of the cellular sector 123 (i.e., until CURRENT_PRB_ALLOCATION≤PRB_ALLOCATION_new).

In one embodiment, in response to receiving an Explicit Congestion Notification (ECN) message, Scheduler 171 sets the cellSector_State parameter to REFUSE, in order to refuse any new video session within the cellular sector 123 until the current allocation of resources in the cellular sector 123 drops below the new maximum available resources of the cellular sector 123 (i.e., until CURRENT_PRB_ALLOCATION≤PRB_ALLOCATION_new).

In one embodiment, in response to an indication of an increase in the maximum available resources of the cellular sector (e.g., PRB_ALLOCATION value has decreased), Scheduler 171 executes the increaseSectorVideos process in order to reallocate available resources of the cellular sector 123 to other video sessions.

(5) NRT Session Timeout:

In one embodiment, Scheduler 171 is configured to execute the nrtTimeout process when a video session request in the NRT queue of the cellular sector 123 has timed out. The timeout may occur for any of a number of reasons, such as where the video session took too long to start or the video recording has ceased. The Scheduler 171 notifies the associated MD 110, which may or may not respond with a request to reset the timeout timer. If the MD 110 responds with a request to reset the timeout timer for the video session, the Scheduler 171 leaves the video session request in the NRT queue of the cellular sector 123. If the MD 110 responds with a request to modify the delivery mode of the video session from NRT to BG, the Scheduler 171 inserts the video session request into the BG queue of the cellular sector 123.

(6) NRT Exit From Cellular Sector:

In one embodiment, Scheduler 171 is configured to execute the nrtExitFromSector process when a MD 110, which has a video session request currently pending in the NRT queue of cellular sector 123, moves to a new cellular sector. In this embodiment, the Scheduler 171 executes the insertSessionRequest(newSectorID) process in order to insert the video session request into the NRT queue of the new cellular sector serving the MD 110.

In one embodiment, Scheduler 171 utilizes a number of associated processes when handling such events as described above. In one embodiment, the Scheduler 171 is configured to execute one or more of the following processes in order to operate on events as they arrive (where use of such events is referenced hereinabove within the context of the descriptions of those events). The processes include the increaseSectorVideos process, the insertSessionRequest process, and the reduceSectorVideos process, descriptions of which follow.

(1) Increase Sector Videos Process:

In one embodiment, Scheduler 171 is configured to execute the increaseSectorVideos process in order to submit one or more video session requests to the videoSessionRequest process until no additional video sessions can be accommodated within the cellular sector 123 without exceeding the budget of resources allocated to the cellular sector 123 (i.e., without exceeding the PRB_ALLOCATED value). The Scheduler 171 may submit the video session request(s) to the videoSessionRequest process in any suitable order (e.g., always selecting the highest priority video session request that can be accommodated as an RT session within the cellular sector 123, randomly selecting from among video session requests that can be accommodated as RT sessions within the cellular sector 123, and the like).

In one embodiment, Scheduler 171 is configured to execute the increaseSectorVideos process in order to increase the transmission bit rates ($TxCBR_{bitrate}$) of existing video sessions of the cellular sector 123 when the NRT queue of the cellular sector 123 is empty, such that (1) for each active video session, $TxCBR_{bitrate} \leq TxMAX$ and (2) CURRRENT_PRB_ALLOCATION$\leq$PRB_ALLOCATION. The transmission bit rates ($TxCBR_{bitrate}$) may be increased in any suitable manner (e.g., increasing all transmission bit rates ($TxCBR_{bitrate}$) of all active video sessions in equal increments, increasing one or more of the transmission bit rates ($TxCBR_{bitrate}$) according to relative priority levels of the active sessions within the cellular sector 123, and the like, as well as various combinations thereof).

(2) Insert Session Request Process:

In one embodiment, Scheduler 171 is configured to execute the insertSessionRequest process based on the delivery mode of the video session request.

If the delivery mode of the video session request is NRT, the Scheduler 171 inserts the video session request into the NRT queue for cellular sector 123. The placement of the video session requests within the NRT queue may be based on the time of the request for cellular sector 123 (where, for some of the video session requests, the original request may have been associated with a different cellular sector).

If the delivery mode of the video session request is BG, the Scheduler 171 inserts the video session request into the BG queue for cellular sector 123.

(3) Reduce Sector Videos:

In one embodiment, Scheduler 171 is configured to execute the red uceSectorVideos process in response to a change in the budget of resources allocated to the cellular sector 123. In this case, the Scheduler 171 reduces allocations of resources to the active video session gracefully according to the amount of the reduction of the budget of resources allocated to the cellular sector 123.

In one embodiment, Scheduler 171 is configured to execute the red uceSectorVideos process in response to a video session request. In this case, the Scheduler 171 reduces the transmission bit rates ($TxCBR_{bitrate}$) of one or more of the active video sessions to free up resources for the new video session while ensuring that $TxCBR_{bitrate} \geq TxMIN$ for all active video sessions of the cellular sector 123.

In one embodiment, Scheduler 171 is configured to accept video session requests in the BG queue as resource availability permits. This may include one or more of off-peak delivery, side loading (e.g., when wireless local area network connections (e.g., via WiFi or other suitable types of wireless access technologies are available), and the like, as well as various combinations thereof.

Although primarily depicted and described herein with respect to use of exemplary processes, it is noted that the functions described herein as being provided by the exemplary processes may be provided in any suitable manner (e.g., one or more of the processes may be combined, one or more of the exemplary processes may be divided into multiple processes, and the like).

Although primarily depicted and described herein with respect to embodiments in which certain types of information (e.g., delivery mode and requested data rate associated with each video session request) are used by Scheduler 171 for scheduling of video session requests, it is noted that, as described herein, one or more other types of information also may be used by the Scheduler 171 to determine scheduling of video session requests (e.g., wireless conditions of the cellular sector 123, the type of video stream to be transmitted via the wireless uplink, the SLA of the user, one or more policies of the network service provider, and the like, as well as various combinations thereof).

The Scheduler 171 provides responses to the uplink video session requests of MDs 110 of cellular sector 123. In general, a response to an MD 110 for an uplink video session includes information associated with the uplink video session to be established. For example, the information may include an indication as to when the uplink video session is to be established such that the video may be transmitted via the uplink video session, an indication of the transmission bit rate that the MD 110 is to use for the uplink video session (which may be translated into the PRBs of the wireless uplink which have been allocated to the MD 110 for the uplink video session), and the like. The Scheduler 171 may provide the responses to the uplink video session requests to the MDs 110 and/or may provide the responses to the uplink video session requests to one or more CAC functions of the network (e.g., which may operate to receive the responses to the uplink video session requests and route them to the MDs 110 and/or receive the responses to the uplink video session requests and send appropriate corresponding uplink video session responses to the MDs 110 on behalf of Scheduler 171). In any event, MDs 110 which send uplink video session requests receive respective uplink video session responses to those uplink video session requests, respectively, such that the MDs 110 may provide video content via the wireless uplink of the cellular sector 123 in accordance with the uplink video transmission schedule determined by Scheduler 171.

Figure 2:
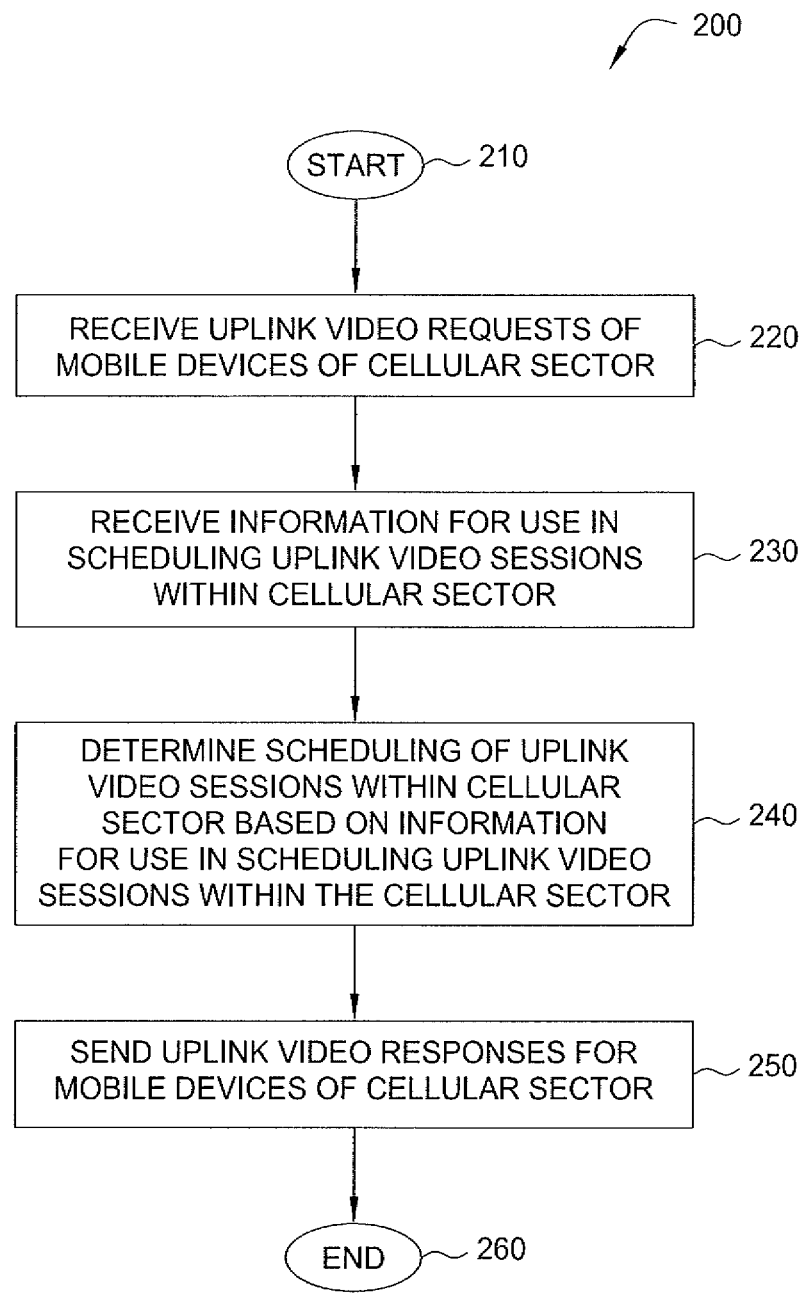
FIG. 2 depicts one embodiment of a method for scheduling uplink video sessions within the cellular sector of FIG. 1.

FIG. 2 depicts one embodiment of a method for scheduling uplink video sessions within the cellular sector of FIG. 1. At step 210, method 200 begins. At step 220, uplink video session requests of MDs of the cellular sector are received. At step 230, information for use in scheduling the uplink video sessions within the cellular sector is received. At step 240, scheduling of the uplink video sessions within the cellular sector is determined based on the received information for use in scheduling uplink video sessions within the cellular sector. At step 250, uplink video session responses for MDs of the cellular sector are sent for delivery to the MDs. At step 260, method 200 ends. It is noted that the steps of method 200 may be better understood by way of reference to the description of FIG. 1.

Figure 3:
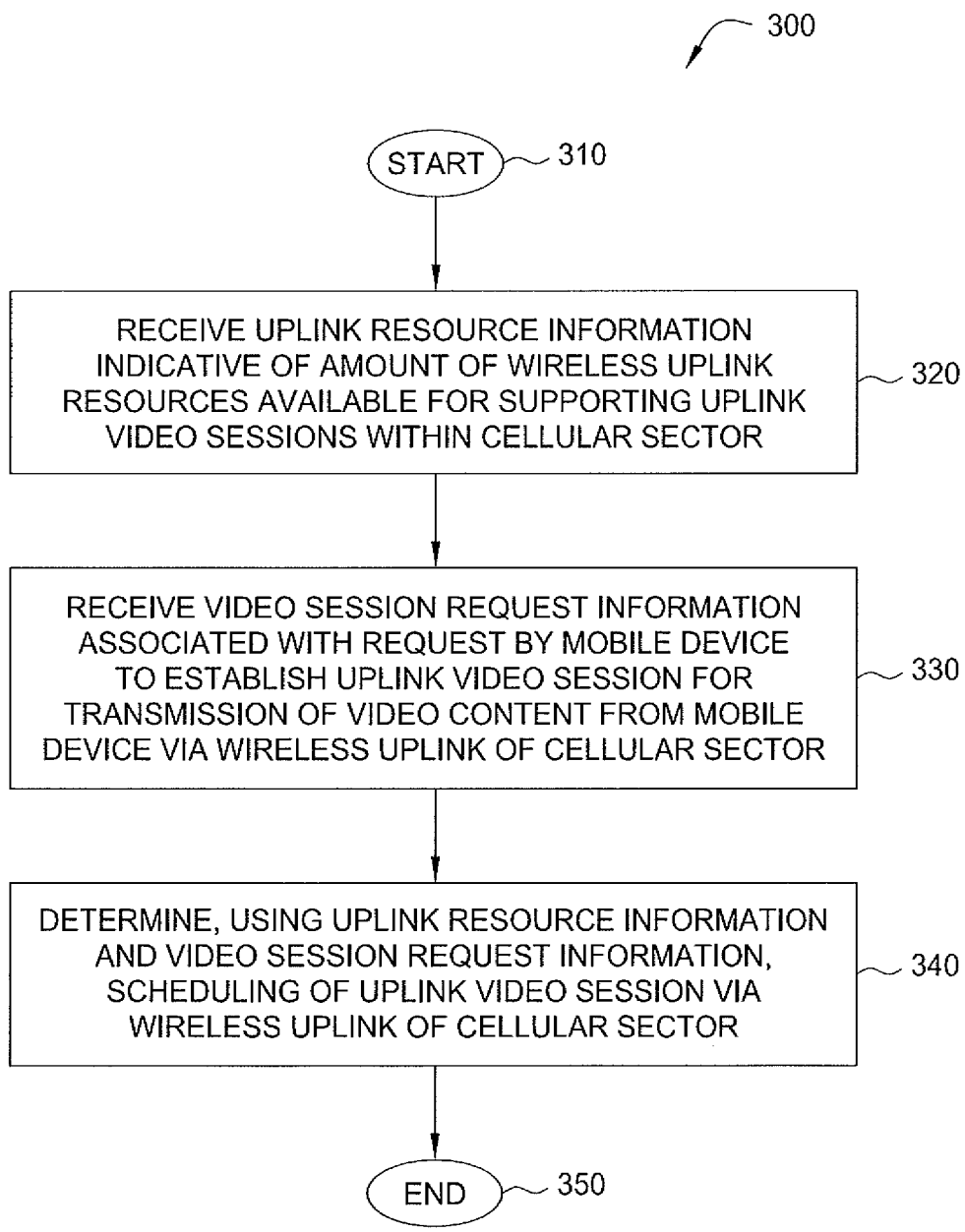
FIG. 3 depicts one embodiment of a method for determining scheduling of an uplink video session of an MD within the cellular sector of FIG. 1.

FIG. 3 depicts one embodiment of a method for determining scheduling of an uplink video session of an MD within the cellular sector of FIG. 1. At step 310, method 300 begins. At step 320, uplink resource information indicative of an amount of wireless uplink resources available for supporting uplink video sessions within the cellular sector is received. At step 330, video session request information associated with a request by a mobile device to establish an uplink video session for transmission of video content from the mobile device via a wireless uplink in the cellular sector is received. At step 340, scheduling of the uplink video session via the wireless uplink in the cellular sector is determined using the uplink resource information indicative of an amount of wireless uplink resources available for supporting uplink video sessions within the cellular sector and the video session request information associated with a request by a mobile device to establish an uplink video session for transmission of video content from the mobile device via a wireless uplink in the cellular sector is received. At step 350, method 300 ends. It is noted that the steps of method 300 may be better understood by way of reference to the description of FIG. 1.

Returning now to FIG. 1, it is noted that, although primarily depicted and described herein with respect to an embodiment in which the Scheduler 171 is implemented as part of Wireless Uplink Controller 170, Scheduler 171 may be implemented in any other suitable manner. In one embodiment, for example, the Scheduler 171 may be implemented in a distributed fashion using multiple elements which may be located in any suitable location(s) within the exemplary wireless communication system 100 (e.g., on one or more existing elements of exemplary wireless communication system 100 and/or on one or more new elements to be deployed within the exemplary wireless communication system 100). In one embodiment, for example, Scheduler 171 may be implemented as a standalone element in any suitable location within exemplary wireless communication system 100 (an exemplary embodiment of which is depicted and described with respect to FIG. 4). It is further noted that various combinations of such embodiments may be used.

Figure 4:
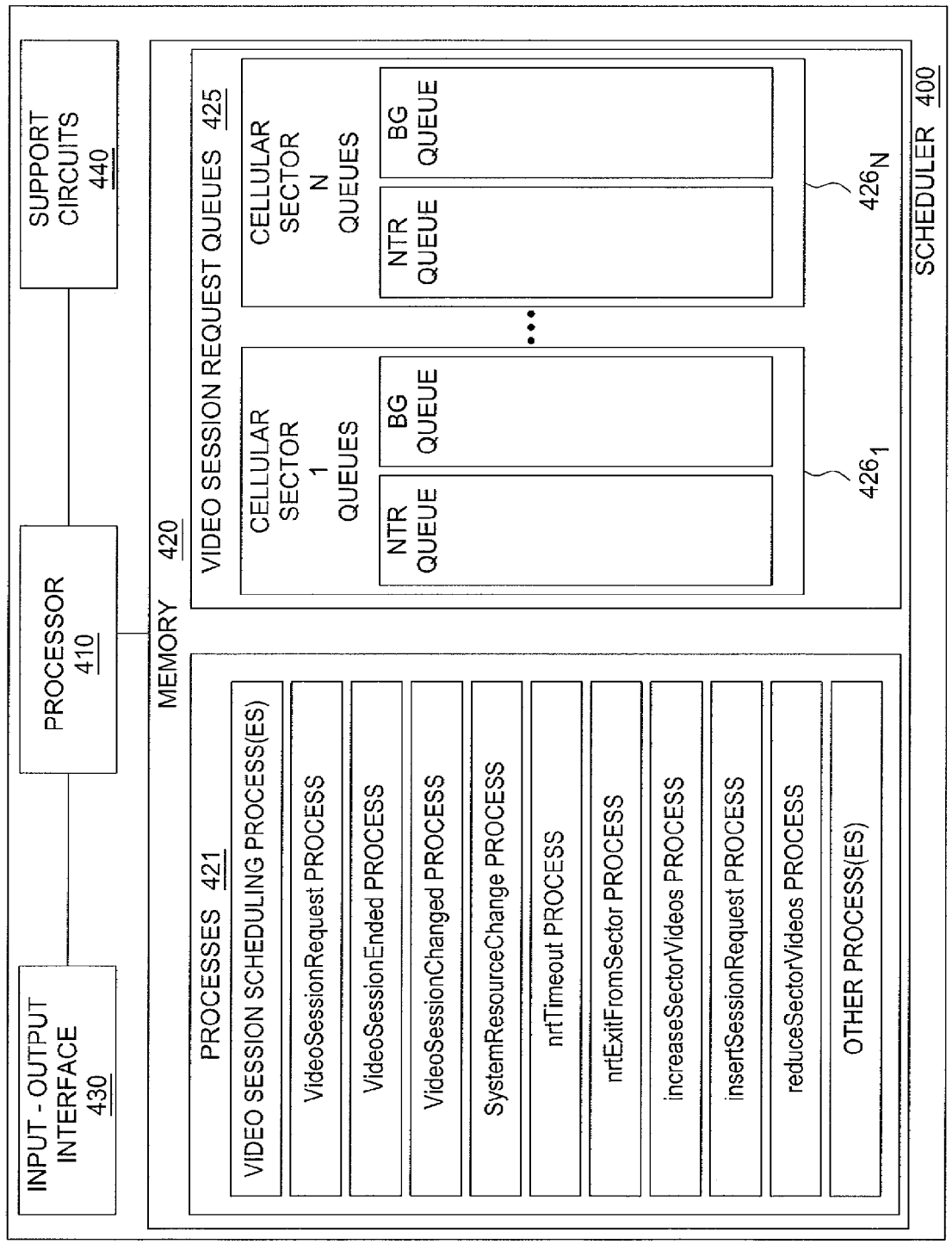
FIG. 4 depicts one embodiment of a Scheduler configured to schedule uplink video sessions within the cellular sector of FIG. 1.

FIG. 4 depicts one embodiment of a Scheduler configured to schedule uplink video sessions within the cellular sector of FIG. 1.

As depicted in FIG. 4, Scheduler 400 includes a processor 410, a memory 420, an input-output interface 430, and support circuits 440.

The processor 410 is coupled to each of memory 420, input-output interface 430, support circuits 440, each of which may be coupled to and/or communicate with each other in various other ways. The processor 421 is configured to control various functions of the video session scheduling capability.

The memory 420 is configured to store processes 421 and maintain video session request queues 425.

The processes 421 may include any processes which may be executed by processor 410 for providing functions of the video session scheduling capability. In one embodiment, for example, processes 421 may include one or more video session scheduling processes (e.g., the VideoSessionRequest process, the VideoSessionEnded process, the VideoSessionChanged process, the SystemResourceChange process, the nrtTimeout process, the nrtExitFromSector process, the increaseSectorVideos process, the insertSessionRequest process, the reduceSectorVideos process, and the like).

The video session request queues 425 are configured to store video session requests for MDs of cellular sectors (e.g., MDs 110 of cellular sector 123). In one embodiment, the video session request queues 425 include a plurality of sets of video session request queues $426_1$-$426_N$ associated with a plurality of cellular sectors of the wireless network with which Scheduler 400 is associated, respectively. For example, set of video session request queues $426_1$ associated with a first cellular sector includes an NRT queue for queuing video session requests of the first cellular sector that are handled as NRT delivery mode requests and a BG queue for queuing video session requests of the first cellular sector that are handled as BG delivery mode requests, set of video session request queues $426_2$ associated with a second cellular sector includes an NRT queue for queuing video session requests of the second cellular sector that are handled as NRT delivery mode requests and a BG queue for queuing video session requests of the second cellular sector that are handled as BG delivery mode requests, and so forth. Although primarily depicted and described with respect to an embodiment in which separate queues are used to maintain NRT video session requests and BG video session requests of a cellular sector, it will be appreciated that NRT video session requests and BG video session requests of a cellular sector may be maintained using a single queue. Although primarily depicted and described with respect to an embodiment in which separate queues are used to maintain video session requests of cellular sectors, respectively, it will be appreciated that video session requests of cellular sectors may be maintained using any suitable numbers of queues.

Although depicted and described with respect to use of a single memory 420 to store processes 421 and maintain video session request queues 425, it is noted that any suitable number of storage modules may be used for storing processes 421 and maintaining video session request queues 425.

The input-output interface 430 provides an interface via which Scheduler 400 may communicate with external devices.

The support circuits 440 include various circuits which may facilitate functions provided by processor 410 and memory 420 (e.g., power supplies and the like).

Returning again to FIG. 1, it is noted that, although primarily depicted and described in FIG. 4 as a standalone element, the Scheduler 400 may be implemented as part of one or more network elements (e.g., Wireless Uplink Controller 170). In one embodiment, Scheduler 400 is used as Scheduler 171 of Wireless Uplink Controller 170 of FIG. 1. It is noted that, where Scheduler 400 is implemented as part of one or more network elements, at least a portion of the elements of the Scheduler 400 may be utilized for providing and/or supporting various other modules and/or capabilities (e.g., processor 410 may execute functions for Scheduler 171 and Manager 172, memory 420 may store processes and/or data for Scheduler 171 and Manager 172, and the like). It is further noted that, although primarily depicted and described herein as being implemented in conjunction with Manager 172, the Scheduler 171 may form part of Manager 172, may be implemented remote from Manager 172 (and, in this case, may communicate with Manager 172 in any suitable manner), and the like.

The Scheduler 171 may be configured to provide various other functions of the wireless uplink control capability.

As described above, Wireless Uplink Controller 170 is configured to provide various functions of the wireless uplink control capability. In one embodiment, a video session management capability is provided for managing video sessions established or to be established via the wireless uplink of a cellular sector. The video session management capability, by enabling video applications to dynamically manage bandwidth on the wireless uplink, improves the reliability of video applications sending video via the wireless uplink of the cellular sector. In one embodiment, various functions of the video session management capability are provided by the Manager 172 depicted and described with respect to FIG. 1.

The Manager 172 is configured to monitor and manage potential and/or established uplink video sessions of MDs 110 of the cellular sector 123.

The Manager 172 is configured to receive information for use in monitoring and managing potential and/or established uplink video sessions of MDs 110 of the cellular sector 123. For example, Scheduler 171 may receive uplink resource information from a management system (e.g., Management System 160 and/or any other suitable source of such information). For example, Scheduler 171 may receive uplink video session requests from MDs 110. For example, Manager 172 receives mobile device location information from RAN 120 and/or WPN 130, such that Manager 172 is able to determine, for each MD 110, the cellular sector to which the MD 110 is connected (illustratively, cellular sector 123). For example, Manager 172 receives, from RAN 120 and/or WPN 130, triggers indicative of presence of resource congestion and, similarly, easing of resource congestion. In one embodiment, such triggers may be provided in the form of Explicit Congestion Notifications (ECNs) from RAN 120 and/or WPN 130. For example, Manager 172 monitors established video sessions by receiving and processing RTCP messages associated with RTP streams of the established video sessions. The Manager 172 may receive various other types of information for use in monitoring and managing potential and/or established uplink video sessions of MDs 110 of the cellular sector 123. The Manager 172 is configured to use such information to monitor and manage potential and/or established uplink video sessions of MDs 110 of the cellular sector 123.

The Manager 172 is configured to provide monitoring and management capabilities using Internet Engineering Task Force (IETF) AudioNideo Transport (AVT) RFCs applying the RTP/RTCP protocols and associated extensions thereof (e.g., RFC 3550 and one or more of the associated RFCs, such as RFC 4585, RFC 5104, RFC 5506, and the like, as well as various combinations thereof). In one embodiment, for example, Manager 172 is implemented as (or as part of), using, and/or in accordance with a Multipoint Control Unit (MCU) as defined by RFC 3550.

In general, RFC 3550 defines RTP and RTCP. RTP is a protocol used to transport the video data in exemplary communication system 100. RTP includes mechanisms to handle jitter and arrival of out-of-order packets in RTP streams. RTCP is a protocol used to control transport of video data via RTP streams in exemplary communication system 100. RTCP includes mechanisms for monitoring of delivery of the video data via RTP streams and gathering/reporting of quality statistics associated with RTP streams (e.g., via RTCP Sender Reports (SRs) and RTCP Receiver Reports (RRs), which may specify parameters such as total RTP packets lost, jitter, total RTP payload sent, and the like).

In general, RFC 4585 (Extended RTP Profile for Real-time Transport Control Protocol (RTCP)-Based Feedback (RTP/AVPF)), defines an extension to the Audio-Visual Profile (AVP) that enables receivers to provide, statistically, more immediate feedback to the senders and, thus, allows for short-term adaptation and efficient feedback-based repair mechanisms to be implemented. RFC 4585 extends the AVP through use of additional parameters such as picture loss indication (PLI), slice loss indication (SLI), reference picture selection indication (RPSI) (ACK/NACK), and the like.

In general, RFC 5104 (Codec Control Messages in the RTP/AVPF), specifies extensions to the messages defined in the RTP/AVPF. RFC 5104 augments RTCP RR messages. RFC 5104 defines a number of messages, including Temporary Maximum Media Stream Bit Rate Request (TMMBR) messages and Temporary Maximum Media Stream Bit Rate Notification (TMMBN) messages. In general, a video receiver is configured to include a TMMBR value in an RTCP/AVPF message in order to request a decrease or increase of the transmission bit rate of the video stream that it is receiving and a video sender is configured to include a TMMBN value in an RTCP/AVPF message as notification of the transmission bit rate that it intends to use for future transmissions of the video stream. RFC 5104 supports additional parameters, such as the temporal spatial trade-off request (TSTR) parameter which is configured to enable suggestions regarding temporal versus spatial tradeoff, the full intra request (FIR) parameter which is configured to enable a request for a decoder refresh, and the like.

In general, RFC 5506 (Reduced-Size RTCP) specifies reduced-size RTCP messages in which the AVPF information is included within the RTCP messages and the SRs/RRs are omitted from the RTCP messages.

The Manager 172 is aware of each of the video sessions of the MDs 110 of the cellular sector 123. In general, for each video session, some basic setup is performed in order to establish the video session. The video sender is granted resources as would typically occur when starting a video session (which may or may not be provided by Scheduler 171). For example, the video sender may be granted a Guaranteed Bit Rate (GBR) and a Maximum Bit Rate (MBR) for the video session, where MBR>GBR, based on the requirements of the video sender. The Manager 172 receives information associated with the video session, e.g., identification of the video sender and the video receiver(s), the location of the video sender in terms of the serving base station of the video sender (which also identifies the cellular sector of the video sender), the parameters allocated for the video session (e.g., GBR, MBR, so forth), and the like, as well as various combinations thereof. The Manager 172 may receive information associated with a video session in any suitable manner. In one embodiment, for example, Manager 172 may be made aware of the video session, including identification of the video sender and the video receiver(s), using Representational State Transfer (REST)-based API web services.

The Manager 172 receives, for each uplink video session of the cellular sector 123 (and, optionally, for other cellular sectors for which the Manager 172 provides management functions, which have been omitted for purposes of clarity), RTCP messages generated during the uplink video session. The RTCP messages for an uplink video session may include one or more of (1) RTCP messages including Receiver Reports (RRs) and/or Sender Reports (SRs) for the uplink video session, (2) RTCP messages including RRs/SRs and associated AVPF information for the uplink video session, and/or (3) RTCP messages including AVPF information (and excluding RRs/SRs) for the uplink video session. The RTCP messages for an uplink video session may include any other suitable types of RTCP messages. While such RTCP messages are usually exchanged between the video senders and video receivers of video sessions, Manager 172 is configured to receive such messages and to use such messages, on a cellular sector basis, to monitor and manage potential and established uplink video sessions of cellular sectors (illustratively, cellular sector 123), respectively.

The Manager 172 collates the information on a per cellular sector basis such that, for each cellular sector, Manager 172 knows all video senders active in the cellular sector as well as details of the uplink video sessions of the active video senders, respectively. The Manager 172 may process such information on a per cellular sector basis such that, for each cellular sector, Manager 172 determines the total allocated GBR and total allocated MBR for all uplink video sessions in the cellular sector.

The Manager 172 may be configured to function in accordance with RFC 5760 during normal uncongested operations, including receiving and processing RTCP SR messages and RR messages, receiving TMMBR messages originating from video receivers and providing the received TMMBR messages to the video senders of the associated video sessions, and the like. As a result, Manager 172 also may determine the transmission bit rate (denoted as $TxCBR_{bitrate}$) of each video session (where $TxCBR_{bitrate}$ is less than or equal to MBR, and may be less than or equal to GBR in certain situations, such as under conditions resulting in a poor signal) and, thus, also may determine a total transmission bit rate of all video senders in the cellular sector ($\Sigma TxCBR_{bitrate}$ over all video senders in the cellular sector).

The Manager 172 is configured to monitor and manage established uplink video sessions of the cellular sector 123 (as well as other cellular sectors for which the Manager 172 provides management functions, which have been omitted for purposes of clarity). The Manager 172 is configured to modify the transmission bit rates of some or all of the video senders of the uplink video sessions in the cellular sector 123. The Manager 172 is configured to determine a new bit rate(s) for a video sender(s) in the cellular sector 123, based on a budget of uplink resources available in the cellular sector 123 for uplink video sessions, current bit rates of the video senders in the cellular sector 123, and the condition(s) triggering the new bit rate(s) for the video sender(s) of the cellular sector 123. The Manager 172 is configured to send a transmission bit rate modification message(s) to the video sender(s), where the transmission bit rate modification message for a video sender is configured to instruct the video sender to transmit video using the new bit rate determined by Manager 172. The Manager 172 may modify the transmission bit rates of some or all of the video senders of the uplink video sessions in the cellular sector 123 in response to various events and/or conditions. The Manager 172 may modify the transmission bit rates of some or all of the video senders by decreasing and/or increasing bit rates of the video senders. The transmission bit rate modification messages may be any suitable type(s) of messages. In one embodiment, the transmission bit rate modification messages are sent as TMMBR messages.

The Manager 172 may send respective transmission bit rate modification messages to some or all of the video senders in the cellular sector 123 for instructing the video senders to reduce their respective bit rates, thereby releasing resources in the cellular sector 123. This may be performed in response to any suitable event or condition. In one embodiment, for example, this may be done to accommodate pending and/or new video session requests (e.g., RT video session requests, pending NRT video session requests, and the like). In one embodiment, for example, this may be done in response to an indication that there is congestion in the cellular sector 123. This may be performed in response to any other suitable event or condition.

The Manager 172 may send respective transmission bit rate modification messages to some or all of the video senders in the cellular sector 123 for instructing each of the video senders to increase their respective bit rates. In one embodiment, for example, this may be done where additional wireless uplink resources are available for use by the active video senders.

The Manager 172 may send respective transmission bit rate modification messages to some or all of the video senders in the cellular sector 123. In this regard, it is noted that respective transmission bit rate modification messages may be sent to all of the video senders of the cellular sector 123 under various conditions (e.g., for throttling bit rates of all video senders to accommodate new uplink video sessions, for throttling bit rates of all video senders during congestion in the cellular sector, and the like). Similarly, in this regard, it is noted that respective transmission bit rate modification messages may be sent to only a subset of the video senders of the cellular sector 123 under various conditions (e.g., where one or more video senders are consuming wireless uplink resources at the detriment of other active or pending video sources, where one or more video senders are entitled to use of additional wireless uplink resources and such additional resources are currently available within the cellular sector 123, and the like).

The Manager 172 may employ combinations of transmission bit rate modification messages, e.g., for decreasing the transmission bit rate(s) of one or more video senders of the cellular sector 123 and increasing the transmission bit rate(s) of one or more video senders of the cellular sector 123.

In at least some such embodiments, the transmission bit rate modification messages may specify modification of bit rates of the video senders by equal or unequal amounts (e.g., based on wireless transmission efficiency of the video senders, MCSs used by the video senders, SLAs of the video senders, application types and/or applications of the video senders, and the like, as well as various combinations thereof).

In at least some such embodiments, any suitable number of transmission bit rate modification messages may be sent to any suitable numbers of video senders, where such transmission bit rate modification messages may request respective decreases and/or increases of bit rates of the video senders. In this manner, Manager 172 is configured to manage the available wireless uplink resources of the cellular sector 123 based on various combinations of factors and conditions (e.g., based on one or more of requests for new video sessions in the cellular sector 123, termination of existing video sessions in the cellular sector 123, indications of congestion, wireless transmission efficiency of the video senders, MCSs used by the video senders, SLAs of the video senders, application types and/or applications of the video senders, and the like, as well as various combinations thereof).

As an example, assume that (1) there are five video senders in a cellular sector, with each video sender having a GBR of 256 Kbps totaling 1.25 Mbps currently allocated for the cellular sector and (2) the maximum bandwidth that can be allocated for uplink video sessions for this cellular sector is 1.25 Mbps. For purposes of simplification, it is assumed that all video senders have identical MCS values (although it is noted that allocation of the wireless uplink resources is in terms of PRBs which may be a function of MCS value). In this example, when a request for a sixth video session, at 128

Kbps, is received, the Manager 172 is prompted to accommodate the new video session. In order to accommodate the new session, the Manager 172 issues five TMMBR messages to each of the five existing video senders, where each TMMBR message indicates a bit rate value of 224 Kbps (i.e., a 32 Kbps reduction each). In this manner, 160 Kbps of wireless uplink capacity is made available for use by the new video session to transmit video at 128 Kbps (or more) via the wireless uplink of the cellular sector. It is noted that, in this example, the transmission bit rates of each of the active video senders are degraded uniformly.

As another example, assume that (1) there are five video senders in a cellular sector, with each video sender having a GBR of 256 Kbps totaling 1.25 Mbps currently allocated for the cellular sector, two of the five video senders have associated SLAs guaranteeing them GBR of 256 Kbps, and (3) the maximum bandwidth that can be allocated for uplink video sessions for this cellular sector is 1.25 Mbps. For purposes of simplification, it is assumed that all video senders have identical MCS values (although it is noted that allocation of the wireless uplink resources is in terms of PRBs which may be a function of MCS value). In this example, when a request for a sixth video session, at 128 Kbps, is received, the Manager 172 is prompted to accommodate the new video session. In order to accommodate the new session, the Manager 172 issues three TMMBR messages to each of the three existing video senders that do not have SLAs guaranteeing them GBR of 256 Kbps, where each TMMBR message indicates a bit rate value of 192 Kbps (i.e., a 64 Kbps reduction each). In this manner, 192 Kbps of wireless uplink capacity is made available for use by the new video session to transmit video at 128 Kbps (or more) via the wireless uplink of the cellular sector. It is noted that, in this example, the transmission bit rate reductions for a subset of the video senders are influenced by the SLAs of two of the video senders (i.e., the higher level subscribers are not impacted, at the detriment of the lower level subscribers).

As another example, assume that (1) there are five video senders in a cellular sector, with each video sender having a GBR of 256 Kbps totaling 1.25 Mbps currently allocated for the cellular sector and (2) the maximum bandwidth that can be allocated for uplink video sessions for this cellular sector is 1.25 Mbps. For purposes of simplification, it is assumed that all video senders have identical MCS values (although it is noted that allocation of the wireless uplink resources is in terms of PRBs which may be a function of MCS value). In this example, when a determination is made that one of the video senders has poor radio conditions such that the video sender cannot utilize the 256 Kbps bit rate, the Manager 172 lowers the transmission bit rate of the video sender with the poor radio conditions and reallocates the excess wireless uplink resources to one or more of the other video senders (e.g., one or more of the other video senders having radio conditions indicative that a higher bit rate can be supported). The Manager 172 allocates resources freed from the video sender with the poor radio conditions to the remaining video senders with better radio conditions. In order to perform such reallocation of wireless uplink resources, the Manager 172 (1) issues a TMMBR message to the video sender with the poor radio conditions, where the TMMBR message indicates a bit rate below 256 Kbps and (2) issues one or more TMMBR messages to the one or more other video senders, where each TMMBR message indicates a bit rate value greater than 256 Kbps.

As another example, assume that (1) there are five video senders in a cellular sector, with each video sender having a GBR of 256 Kbps totaling 1.25 Mbps currently allocated for the cellular sector and (2) the maximum bandwidth that can be allocated for uplink video sessions for this cellular sector is 1.25 Mbps. For purposes of simplification, it is assumed that all video senders have identical MCS values (although it is noted that allocation of the wireless uplink resources is in terms of PRBs which may be a function of MCS value). In this example, a video receiver that is receiving video from one of the five video senders sends a TMMBR message requesting a lower transmission bit rate of 128 Kbps. The Manager 172 receives the TMMBR message from the video sender and forwards the TMMBR message to the associated video sender which then lowers its transmission rate from 256 Kbps to 128 Kbps, thereby resulting in available bandwidth which may be reallocated by Manager 172. The Manager 172 allocates the resources freed from the video sender to one or more of the other video senders. In order to perform such reallocation of wireless uplink resources, the Manager 172 issues one or more TMMBR messages to the one or more other video senders, where each TMMBR message indicates a bit rate value greater than 256 Kbps. It is noted that the foregoing examples are merely a few of the many ways in which the transmission bit rates of video senders may be managed (e.g., increased and/or decreased) in accordance with the various embodiments of the wireless uplink control capability.

Figure 5:
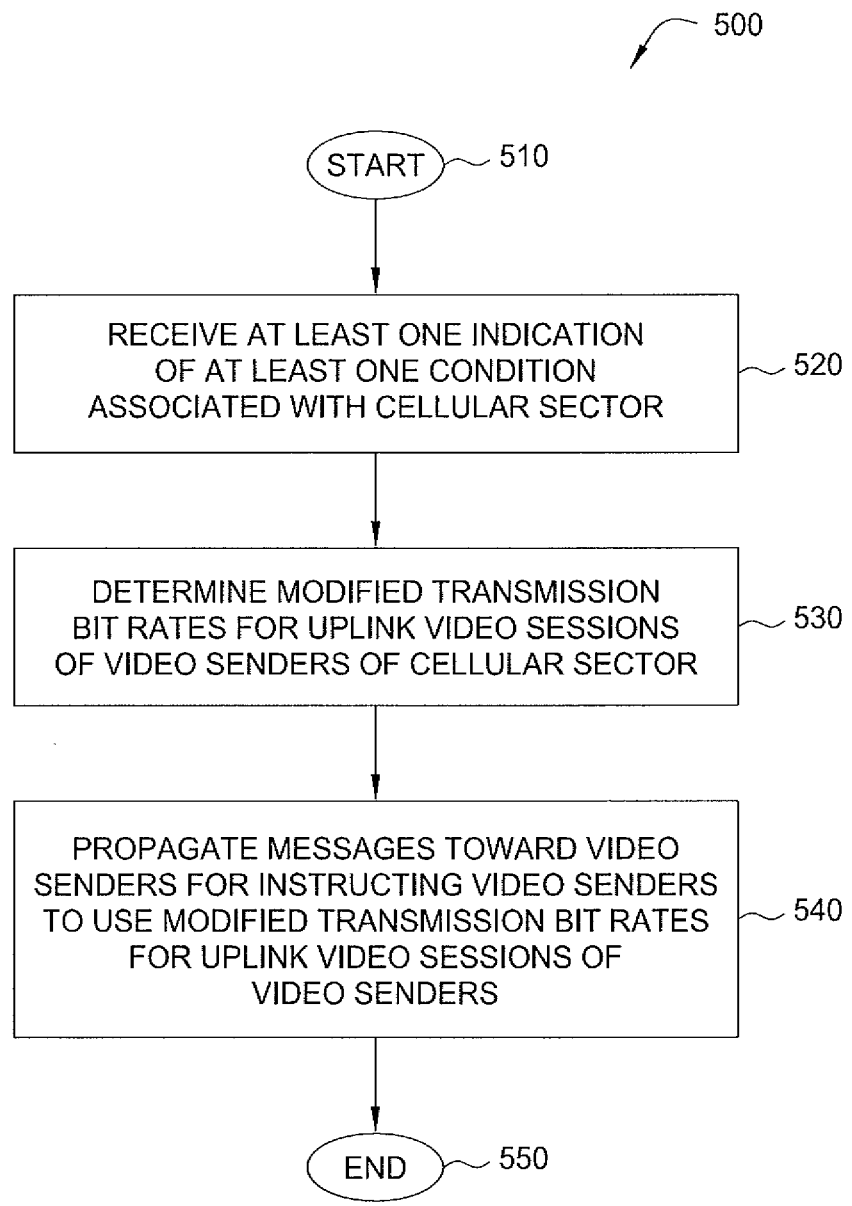
FIG. 5 depicts one embodiment of a method for modifying transmission bit rates of uplink video sessions of MDs within the cellular sector of FIG. 1.

FIG. 5 depicts one embodiment of a method for modifying transmission bit rates of uplink video sessions of MDs within the cellular sector of FIG. 1.

At step 510, method 500 begins.

At step 520, at least one indication of at least one condition associated with the cellular sector is received. The condition may include one or more of a congestion condition in the cellular sector, a congestion condition associated with a network element serving at least the cellular sector, a request for a new video session to be established within the cellular sector, a termination of an existing video session within the cellular sector, and the like, as well as various combinations thereof.

At step 530, modified transmission bit rates for uplink video sessions of video senders of the cellular sector are determined. In one embodiment, the modified transmission bit rates are determined using information associated with the at least one condition, information indicative of an amount of wireless uplink resources available for supporting uplink video sessions within the cellular sector, and information indicative of current bit rates supported by the video senders (e.g., as determined from RTCP SRs/RRs and/or any other suitable source(s) of such information).

At step 540, messages are propagated toward the video senders for instructing the video senders to use the modified transmission bit rates for the uplink video sessions. In one embodiment, the messages are TMMBR messages including the values of the modified transmission bit rates or values which may be used by the video senders to determine the modified transmission bit rates to be used (e.g., values indicative of the amount by which the current bit rates would need to be changed in order to arrive at the modified transmission bit rates).

At step 550, method 500 ends.

Figure 6:
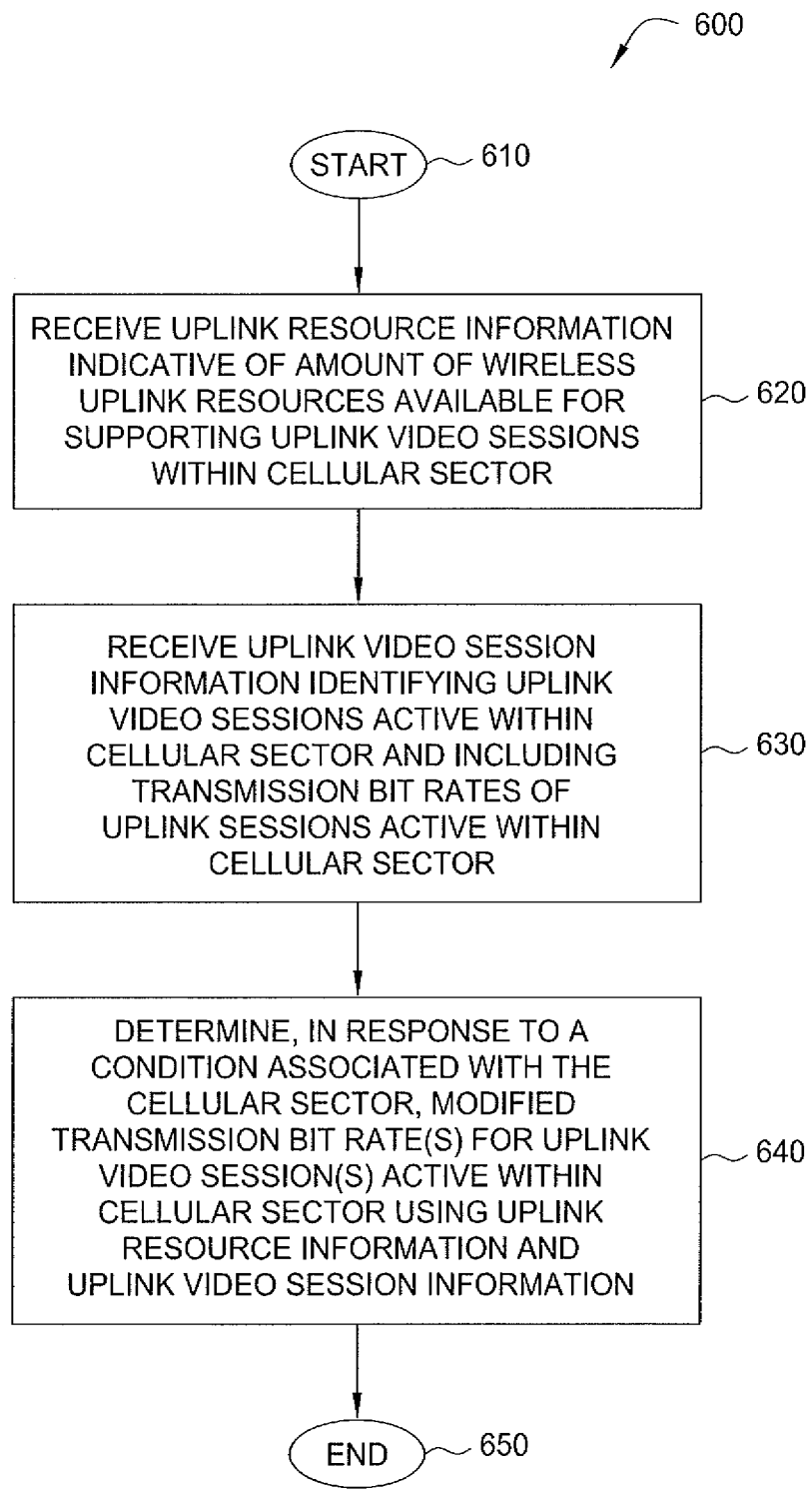
FIG. 6 depicts one embodiment of a method for modifying transmission bit rates of uplink video sessions of MDs within the cellular sector of FIG. 1.

FIG. 6 depicts one embodiment of a method for modifying transmission bit rates of uplink video sessions of MDs within the cellular sector of FIG. 1.

At step 610, method 600 begins.

At step 620, uplink resource information indicative of an amount of wireless uplink resources available for supporting uplink video sessions within the cellular sector is received.

At step 630, uplink video session information, identifying a plurality of uplink video sessions active within the cellular sector and including a plurality of transmission bit rates of the respective uplink video sessions active within the cellular sector, is received. The uplink video session information may be received in the form of one or more of RTCP SRs, RTCP RRs, AVPF messages, and the like, At step 640, in response to a condition associated with the cellular sector, a modified transmission bit rate for one of the respective uplink video sessions active within the cellular sector is determined using the wireless uplink resource information and the uplink video session information. The condition may include one or more of an increase in congestion in the cellular sector, a decrease in congestion in the cellular sector, a request for a new video session to be established within the cellular sector, a termination of an existing video session within the cellular sector, and the like, as well as various combinations thereof.

At step 650, method 600 ends.

Figure 7:
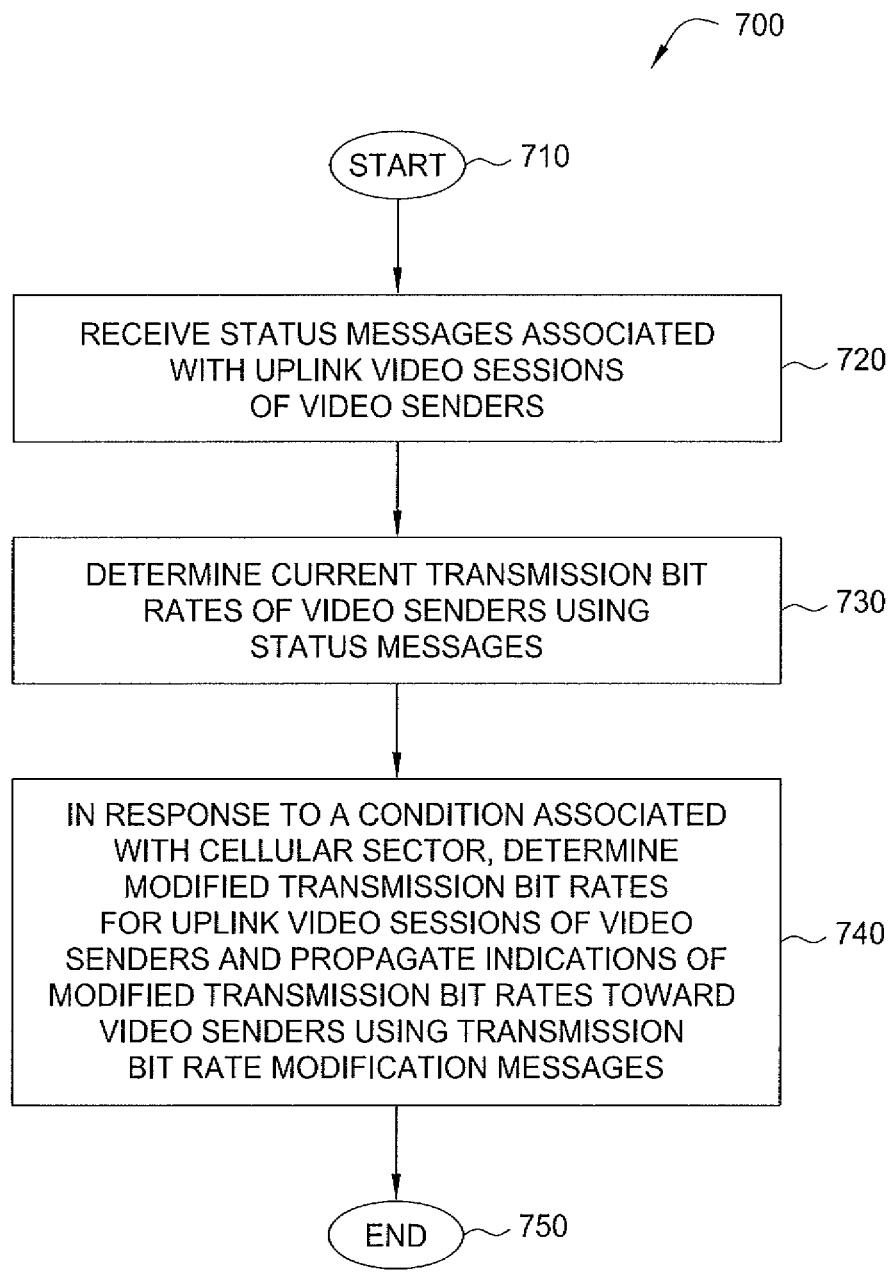
FIG. 7 depicts one embodiment of a method for controlling bit rates of a plurality of uplink video sessions of a respective plurality of MDs within the cellular sector of FIG. 1.

FIG. 7 depicts one embodiment of a method for controlling bit rates of a plurality of uplink video sessions of a respective plurality of MDs within the cellular sector of FIG. 1.

At step 710, method 700 begins.

At step 720, status messages associated with the uplink video sessions of the video senders are received. The status messages may include one or more of RTCP SRs, RTCP RRs, AVPF messages, and the like.

At step 730, a plurality of current transmission bit rates of the respective uplink video sessions of the video senders are determined using the status messages.

At step 740, in response to a condition associated with the cellular sector, a plurality of modified transmission bit rates for the respective uplink video sessions of the video senders are determined and indications of the modified transmission bit rates for the respective uplink video sessions are propagated toward the respective video senders using a respective plurality of transmission bit rate modification messages. The transmission bit rate modification messages may include TMMBR messages.

At step 750, method 700 ends.

Returning now to FIG. 1, it is noted that the Manager 172 may be configured to provide various other types of functions in conjunction with modification of bit rates of video senders of a cellular sector.

In one embodiment, Manager 172 is configured to monitor bit rate requirements for all devices participating in video sessions which are originating from the cellular sector. For example, the Manager 172 may monitor the transmission bit rate requirements of all video senders within the cellular sector and monitor the transmission bit rate requirements of all video receivers participating in video sessions originating from the cellular sector. In one embodiment, Manager 172 uses such information for requesting modifications of bit rates via transmission bit rate modification messages. In one embodiment, the Manager 172 provides such information to Scheduler 171 for use by Scheduler 171 in performing various scheduling functions (which also may result in requests by Scheduler 171 for Manager 172 to issue transmission bit rate modification messages for modifying transmission bit rates of video senders within the cellular sector).

In one embodiment, in which the Manager 172 is performing monitoring and management of bit rates of video senders of the cellular sector 123, the Manager 172 may be configured to provide information to the associated BS 122 of the cellular sector 123 for use by a Call Admission Control (CAC) mechanism of the BS 122 in performing call admission control functions. In one embodiment, for example, the total transmission bit rate of the cellular sector 123, as determined by Manager 172, may be used by the CAC mechanism of the BS 122 to admit additional resources when the total transmission bit rate of the cellular sector 123 is less than the total resources of the cellular sector 123. It is noted that, while the total transmission bit rate of the cellular sector 123 is subject to change over time as the individual $TxCBR_{bitrate}$ values of the video senders change (i.e., such that the CAC mechanism of the BS 122 may not be able to always safely rely on the total transmission bit rate value), with cooperation with Manager 172 the CAC mechanism of the BS 122 could rely on the total transmission bit rate translated into total resources (such as PRBs) of the cellular sector 123 for performing call admission by using a mechanism that would inform the Manager 172 to enforce $TxCBR_{bitrate}$ for a video sender as the MBR (i.e., do not allow $TxCBR_{bitrate}$ to increase for any video sender). This mechanism may be used in response to various events and conditions (e.g., as a temporary state while the system deals with sudden congestion or for any other suitable purpose). Additionally, if a video sender determines that its new bit rate is no longer temporary, it is expected to renegotiate a new bit rate with the video receivers (e.g., via SIP messaging or any other suitable type of messaging), thereby resulting in new GBR and MBR values for the video session which may then be used by the CAC mechanism of the BS 122 for call admission calculations.

Although primarily depicted and described herein with respect to embodiments in which the video senders of the cellular sector 123 are using Source-Specific Multicast (SSM) (i.e., in which there is a single video sender and multiple video receivers for each uplink video session), it is noted that the various functions of Manager 172 depicted and described herein may be adapted for use within other types of uplink video sessions provided using other types of content distribution schemes.

It is noted that uplink video sessions which do not utilize the services of Manager 172 are possibly only afforded Best Effort treatment and, thus, would be unreliable in the event of congestion.

Although primarily depicted and described herein with respect to controlling transmission bit rates of video senders on a per cellular sector basis, it is noted that the Manager 172 also may be configured to control transmission bit rates of video senders of multiple cellular sectors as a group. In one embodiment, for example, in the event of congestion at a higher level of the network, the Manager 172 may control bit rates of video senders associated with all of the cellular sectors served by the higher level of the network experiencing congestion. For example, in the event of congestion at a Serving Gateway (SGW) in a 3GPP network, the Manager 172 may issue TMMBRs to some or all video senders in some or all of the cellular sectors having associated data paths supported by the SGW. Similarly, for example, in the in the event of congestion at a PDN Gateway (PGW) in a 3GPP network, the Manager 172 may issue TMMBRs to some or all video senders in some or all of the cellular sectors having associated data paths supported by the PGW. It is noted that the Manager 172 may be configured to support various other granularities of monitoring and control of bit rates of video senders.

Although primarily depicted and described herein with respect to controlling transmission bit rates of video senders using specific control protocols (e.g., RTP/RTCP and related protocols), it is noted that Manager 172 also may be configured to control transmission bit rates of video senders using various other suitable protocols. Accordingly, references herein to RTCP status messages (e.g., RTCP SRs, RTCP RRs, AVPF messages, and the like) may be read more generally as being status messages or status traffic and references herein to RTCP-based transmission bit rate modification messages (e.g., TMMBR messages) may be read more generally as being transmission bit rate modification messages.

Although primarily depicted and described herein with respect to providing embodiments of the wireless uplink control capability within a cellular network, it is noted that embodiments of the wireless uplink control capability also may be provided in other types of wireless networks, such as other types of wireless wide area networks (e.g., other than cellular-based networks), wireless local area networks (e.g., Wireless Fidelity (WiFi networks and the like), and the like. Accordingly, it is noted that various terms used herein within the context of specific types of wireless networks may be referred to more generally. For example, although primarily depicted and described within the context of PRBs, it is noted that other types of terms are used in other types of networks (e.g., the term "slot is used in WiMAX networks), such that references herein to PRBs may be read more generally as being references to wireless resource allocation units.

Figure 8:
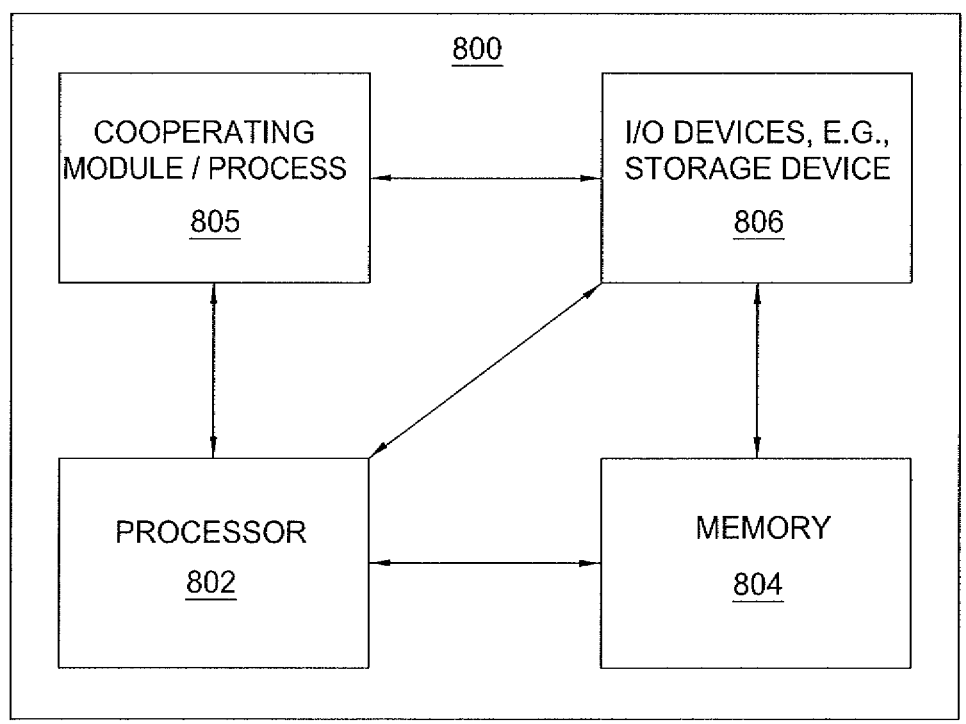
FIG. 8 depicts a high-level block diagram of a computer suitable for use in performing the functions described herein.

FIG. 8 depicts a high-level block diagram of a computer suitable for use in performing functions described herein.

As depicted in FIG. 8, computer 800 includes a processor element 802 (e.g., a central processing unit (CPU) and/or other suitable processor(s)) and a memory 804 (e.g., random access memory (RAM), read only memory (ROM), and the like). The computer 800 also may include a cooperating module/process 805 and/or various input/output devices 806 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software (e.g., via implementation of software on one or more processors) and/or hardware (e.g., using a general purpose computer, one or more application specific integrated circuits (ASIC), and/or any other hardware equivalents).

It will be appreciated that the functions depicted and described herein may be implemented in software for executing on a general purpose computer (e.g., via execution by one or more processors) so as to implement a special purpose computer, and/or may be implemented in hardware (e.g., using one or more application specific integrated circuits (ASIC) and/or one or more other hardware equivalents).

In one embodiment, the cooperating process 805 can be loaded into memory 804 and executed by processor 802 to implement functions as discussed herein. Thus, cooperating process 805 (including associated data structures) can be stored on a computer readable storage medium, e.g., RAM memory, magnetic or optical drive or diskette, and the like.

It will be appreciated that computer 800 depicted in FIG. 8 provides a general architecture and functionality suitable for implementing functional elements described herein and/or portions of functional elements described herein. For example, the computer 800 provides a general architecture and functionality suitable for implementing one or more of one of the MDs 110, the BS 122, one of the servers 150, the Management System 160, the Wireless Uplink Controller 170, the Scheduler 171, and the Manager 172.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus for scheduling a video session within a cellular sector of a wireless network, the apparatus comprising:

a processor and a memory communicatively connected to the processor, the processor configured to:

receive uplink resource information indicative of an amount of wireless uplink resources available for supporting uplink video sessions within the cellular sector, the uplink resource information comprising a maximum resource allocation value indicative of a budget of wireless uplink resources available for supporting uplink video sessions within the cellular sector and a current resource allocation value indicative of an amount of wireless uplink resources currently allocated for supporting uplink video sessions within the cellular sector;

receive video session request information associated with a request by a mobile device to establish an uplink video session for transmission of video content from the mobile device via a wireless uplink in the cellular sector, wherein the video session request information comprises a bit rate requested by the mobile device for the uplink video session, a minimum bit rate acceptable to the mobile device for the uplink video session, and a delivery mode requested by the mobile device for the uplink video session; and determine, based on the uplink resource information and the video session request information including the delivery mode requested by the mobile device for the uplink video session, scheduling of the uplink video session via the wireless uplink in the cellular sector, wherein, to determine scheduling of the uplink video session via the wireless uplink in the cellular sector, the processor is configured to:

determine a bit rate for the uplink video session, wherein the determined bit rate for the uplink video session is greater than or equal to the minimum bit rate acceptable to the mobile device for the uplink video session and less than or equal to the bit rate requested by the mobile device for the uplink video session;

determine, based on the current resource allocation of the cellular sector, the maximum resource allocation of the cellular sector, and the determined bit rate for the uplink video session, whether the cellular sector has available wireless uplink resources sufficient to support the uplink video session at the determined bit rate for the uplink video session; and based on a result of the determination as to whether the cellular sector has available wireless uplink resources sufficient to support the uplink video session at the determined bit rate for the uplink video session:

propagate a response including the determined bit rate for the uplink video session toward the mobile device; or determine whether to initiate a process for reducing at least one current bit rate of at least one respective active uplink video session of the cellular sector or whether to queue the request by the mobile device to establish the uplink video session.

2. The apparatus of claim 1, wherein the delivery mode requested by the mobile device for the uplink video session indicates a request for real-time transmission of the video content.

3. The apparatus of claim 1, wherein the wireless uplink resources comprise wireless resource allocation units on the wireless uplink.

4. The apparatus of claim 1, wherein the video session request information comprises at least one of a list of one or more intended video receivers for the uplink video session, a timeout delay value indicative of a maximum time for which start of the uplink video session may be delayed, and a negotiability parameter indicative of extent of negotiability of one or more parameters of the video session request information.

5. The apparatus of claim 1, wherein to determine scheduling of the uplink video session, the processor is configured to:
determine scheduled information configured for use by the mobile device to control establishment of the uplink video session via the wireless uplink in the cellular sector.

6. The apparatus of claim 1, wherein, to determine scheduling of the uplink video session, the processor is configured to:
determine a time at which the uplink video session may begin.

7. The apparatus of claim 1, wherein the processor is configured to:
propagate the response including the determined bit rate for the uplink video session toward the mobile device based on a determination that the available wireless uplink resources are sufficient to support the uplink video session at the determined bit rate for the uplink video session.

8. The apparatus of claim 1, wherein the processor is configured to:
determine whether to initiate the process for reducing at least one current bit rate of at least one respective active uplink video session of the cellular sector or whether to queue the request by the mobile device to establish the uplink video session based on a determination that the available wireless uplink resources are insufficient to support the uplink video session at the determined bit rate for the uplink video session.

9. The apparatus of claim 1, wherein the processor is configured to:
receive second uplink resource information indicative of a second amount of wireless uplink resources available for supporting uplink video sessions within the cellular sector, the second uplink resource information comprising a second maximum resource allocation value indicative of a second budget of wireless uplink resources available for supporting uplink video sessions within the cellular sector and a second current resource allocation value indicative of a second amount of wireless uplink resources currently allocated for supporting uplink video sessions within the cellular sector;

receive second video session request information associated with a second request by the mobile device to establish a second uplink video session for transmission of second video content from the mobile device via the wireless uplink in the cellular sector, wherein the second video session request information comprises a second bit rate requested by the mobile device for the second uplink video session, a second minimum bit rate acceptable to the mobile device for the second uplink video session, and a second delivery mode requested by the mobile device for the second uplink video session; and determine, based on the second uplink resource information and the second video session request information including the second delivery mode requested by the mobile device for the second uplink video session, scheduling of the second uplink video session via the wireless uplink in the cellular sector, wherein, to determine scheduling of the second uplink video session via the wireless uplink in the cellular sector, the processor is configured to:

determine, based on the second current resource allocation of the cellular sector, the second maximum resource allocation of the cellular sector, and the second minimum bit rate acceptable to the mobile device for the second uplink video session, whether the cellular sector currently has available wireless uplink resources sufficient to support the second uplink video session; and based on a determination that the cellular sector currently has available wireless uplink resources sufficient to support the second uplink video session, negotiate a bit rate for the uplink video session and propagate toward the mobile device a response including the negotiated bit rate for the second uplink video session, wherein the negotiated bit rate for the second uplink video session is greater than or equal to the second minimum bit rate acceptable to the mobile device for the second uplink video session and less than or equal to the second bit rate requested by the mobile device for the second uplink video session;

based on a determination that the cellular sector does not currently have available wireless uplink resources sufficient to support the second uplink video session, queue the second request by the mobile device to establish the second uplink video session.

10. The apparatus of claim 9, wherein the memory is configured to maintain a queue for the cellular sector, wherein the processor is further configured to:
based on a determination that the second delivery mode for the second uplink video session indicates near-real-time transmission of the second video content, queue the second request by the mobile device to establish the second uplink video session within a first portion of the queue associated with near-real-time uplink video session requests of the cellular sector; and
based on a determination that the second delivery mode for the second uplink video session indicates background transmission of the second video content, queue the second request by the mobile device to establish the second uplink video session within a second portion of the queue associated with background uplink video session requests of the cellular sector.

11. The apparatus of claim 1, wherein the processor is further configured to:
in response to an indication that an existing uplink video session of the cellular sector has terminated:

update the current resource allocation value of the cellular sector by a transmission bit rate of the terminated existing uplink video session; and
initiate a process for reallocating available wireless uplink resources of the cellular sector.

12. The apparatus of claim 11, wherein, to initiate a process for reallocating available wireless uplink resources of the cellular sector, the processor is configured to:
based on a determination that a pending uplink video session request having a delivery mode indicating real-time transmission of video content is pending, determine scheduling of the pending uplink video session via the wireless uplink in the cellular sector.

13. The apparatus of claim 11, wherein, to initiate a process for reallocating available wireless uplink resources of the cellular sector, the processor is configured to:
based on a determination that a queue associated with the cellular sector includes a pending uplink video session request having a delivery mode indicating non-real-time transmission of video content, determine scheduling of the pending uplink video session via the wireless uplink in the cellular sector; and
based on a determination that a queue associated with the cellular sector does not include a pending uplink video session request having a delivery mode indicating non-real-time transmission of video content, initiate a process for increasing a plurality of transmission bit rates of a plurality of video senders active within the cellular sector using the available wireless uplink resources of the cellular sector.

14. The apparatus of claim 1, wherein the processor is further configured to:
based on an indication that a transmission bit rate of an existing uplink video session of the cellular sector has been reduced:
update the current resource allocation value of the cellular sector by an amount by which the transmission bit rate of the existing uplink video session has been reduced; and
initiate a process for reallocating available wireless uplink resources of the cellular sector.

15. The apparatus of claim 14, wherein, to initiate a process for reallocating available wireless uplink resources of the cellular sector, the processor is configured to:
based on a determination that a pending uplink video session request having a delivery mode indicating real-time transmission of video content is pending, determine scheduling of the pending uplink video session via the wireless uplink in the cellular sector.

16. The apparatus of claim 14, wherein, to initiate a process for reallocating available wireless uplink resources of the cellular sector, the processor is configured to:
based on a determination that a queue associated with the cellular sector includes a pending uplink video session request having a delivery mode indicating non-real-time transmission of video content, determine scheduling of the pending uplink video session via the wireless uplink in the cellular sector; and
based on a determination that a queue associated with the cellular sector does not include a pending uplink video session request having a delivery mode indicating non-real-time transmission of video content, initiate a process for increasing a plurality of transmission bit rates of a plurality of video senders active within the cellular sector using the available wireless uplink resources of the cellular sector.

17. The apparatus of claim 1, wherein the processor is further configured to:
based on a determination that the maximum resource allocation value has been reduced to a reduced maximum resource allocation value:
initiate a process configured to reduce at least one transmission bit rate of at least one uplink video session active within the cellular sector.

18. The apparatus of claim 17, wherein the process is configured to reduce a plurality of transmission bit rates of a plurality of uplink video session active within the cellular sector.

19. The apparatus of claim 17, wherein each active uplink video session within the cellular sector has a minimum transmission bit rate associated therewith, wherein the process is configured to reduce each current transmission bit rate of each active uplink video session within the cellular sector while maintaining the current transmission bit rates of the active uplink video sessions at or above the minimum transmission bit rates of the active uplink video sessions.

20. The apparatus of claim 17, wherein the processor is configured to initiate the process after expiration of a timer.

21. The apparatus of claim 17, wherein at least one new uplink video session request is refused while the current resource allocation value is greater than the reduced maximum resource allocation value.

22. The apparatus of claim 1, wherein the processor is further configured to:
receive second video session request information associated with a second request by the mobile device to establish a second uplink video session for transmission of second video content from the mobile device via the wireless uplink in the cellular sector, wherein the second video session request information comprises a second delivery mode requested by the mobile device for the second uplink video session;
based on a determination that the second delivery mode for the second uplink video session indicates a request for near-real-time transmission of the second video content, queue the second request within a queue maintaining near-real-time uplink video session requests of the cellular sector, wherein the queued second request has a timer associated therewith;
in response to a determination that the timer has expired, send a notification that the timer has expired toward the user device;
receive a response from the user device; and
process the response from the user device for determining handling of the second request.

23. The apparatus of claim 22, wherein, to process the response from the user device for determining handling of the second request, the processor is configured to:
based on a determination that the response from the user device includes a request by the user device to reset the timer, reset the timer associated with the queued second request; or
based on a determination that the response from the user device includes a request to change the delivery mode for the second uplink video session from the request for near-real-time transmission of the second video content to a request for background transmission of the second video content, move the queued second request from the queue maintaining near-real-time uplink video session requests of the cellular sector to a queue maintaining background uplink video session requests of the cellular sector.

24. A non-transitory computer-readable storage medium storing instructions which, when executed by a computer, cause the computer to perform a method for scheduling a video session within a cellular sector of a wireless network, the method comprising:
- receiving uplink resource information indicative of an amount of wireless uplink resources available for supporting uplink video sessions within the cellular sector, the uplink resource information comprising a maximum resource allocation value indicative of a budget of wireless uplink resources available for supporting uplink video sessions within the cellular sector and a current resource allocation value indicative of an amount of wireless uplink resources currently allocated for supporting uplink video sessions within the cellular sector;
- receiving video session request information associated with a request by a mobile device to establish an uplink video session for transmission of video content from the mobile device via a wireless uplink in the cellular sector, wherein the video session request information comprises a bit rate requested by the mobile device for the uplink video session, a minimum bit rate acceptable to the mobile device for the uplink video session, and a delivery mode requested by the mobile device for the uplink video session; and
- determining, based on the uplink resource information and the video session request information including the delivery mode requested by the mobile device for the uplink video session, scheduling of the uplink video session via the wireless uplink in the cellular sector, wherein determining scheduling of the uplink video session via the wireless uplink in the cellular sector comprises:
  - determining a bit rate for the uplink video session, wherein the determined bit rate for the uplink video session is greater than or equal to the minimum bit rate acceptable to the mobile device for the uplink video session and less than or equal to the bit rate requested by the mobile device for the uplink video session;
  - determining, based on the current resource allocation of the cellular sector, the maximum resource allocation of the cellular sector, and the determined bit rate for the uplink video session, whether the cellular sector has available wireless uplink resources sufficient to support the uplink video session at the determined bit rate for the uplink video session; and
  - based on a result of the determination as to whether the cellular sector has available wireless uplink resources sufficient to support the uplink video session at the determined bit rate for the uplink video session:
    - propagating a response including the determined bit rate for the uplink video session toward the mobile device; or
    - determining whether to initiate a process for reducing at least one current bit rate of at least one respective active uplink video session of the cellular sector or whether to queue the request by the mobile device to establish the uplink video session.

25. A method for scheduling a video session within a cellular sector of a wireless network, comprising:
using a processor and a memory for:
- receiving uplink resource information indicative of an amount of wireless uplink resources available for supporting uplink video sessions within the cellular sector, the uplink resource information comprising a maximum resource allocation value indicative of a budget of wireless uplink resources available for supporting uplink video sessions within the cellular sector and a current resource allocation value indicative of an amount of wireless uplink resources currently allocated for supporting uplink video sessions within the cellular sector;
- receiving video session request information associated with a request by a mobile device to establish an uplink video session for transmission of video content from the mobile device via a wireless uplink in the cellular sector, wherein the video session request information comprises a bit rate requested by the mobile device for the uplink video session, a minimum bit rate acceptable to the mobile device for the uplink video session, and a delivery mode requested by the mobile device for the uplink video session; and
- determining, based on the uplink resource information and the video session request information including the delivery mode requested by the mobile device for the uplink video session, scheduling of the uplink video session via the wireless uplink in the cellular sector, wherein determining scheduling of the uplink video session via the wireless uplink in the cellular sector comprises:
  - determining a bit rate for the uplink video session, wherein the determined bit rate for the uplink video session is greater than or equal to the minimum bit rate acceptable to the mobile device for the uplink video session and less than or equal to the bit rate requested by the mobile device for the uplink video session;
  - determining, based on the current resource allocation of the cellular sector, the maximum resource allocation of the cellular sector, and the determined bit rate for the uplink video session, whether the cellular sector has available wireless uplink resources sufficient to support the uplink video session at the determined bit rate for the uplink video session; and
  - based on a result of the determination as to whether the cellular sector has available wireless uplink resources sufficient to support the uplink video session at the determined bit rate for the uplink video session:
    - propagating a response including the determined bit rate for the uplink video session toward the mobile device; or
    - determining whether to initiate a process for reducing at least one current bit rate of at least one respective active uplink video session of the cellular sector or whether to queue the request by the mobile device to establish the uplink video session.

26. The apparatus of claim 1, wherein, to determine whether to initiate the process for reducing at least one current bit rate of at least one respective active uplink video session of the cellular sector or whether to queue the request by the mobile device to establish the uplink video session, the processor is configured to:
- determine whether the delivery mode requested by the mobile device for the uplink video session is a hard constraint or a soft constraint.

27. The apparatus of claim 26, wherein the processor is configured to:
- initiate the process for reducing at least one current bit rate of at least one respective active uplink video session of the cellular sector based on a determination that the delivery mode requested by the mobile device for the uplink video session is a hard constraint.

28. The apparatus of claim 26, wherein the processor is configured to:
queue the request by the mobile device to establish the uplink video session based on a determination that the delivery mode requested by the mobile device for the uplink video session is a soft constraint.

29. An apparatus for scheduling a video session within a cellular sector of a wireless network, the apparatus comprising:
a processor and a memory communicatively connected to the processor, the processor configured to:
receive uplink resource information indicative of an amount of wireless uplink resources available for supporting uplink video sessions within the cellular sector, the uplink resource information comprising a maximum resource allocation value indicative of a budget of wireless uplink resources available for supporting uplink video sessions within the cellular sector and a current resource allocation value indicative of an amount of wireless uplink resources currently allocated for supporting uplink video sessions within the cellular sector;
receive video session request information associated with a request by a mobile device to establish an uplink video session for transmission of video content from the mobile device via a wireless uplink in the cellular sector, wherein the video session request information comprises a bit rate requested by the mobile device for the uplink video session, a minimum bit rate acceptable to the mobile device for the uplink video session, and a delivery mode requested by the mobile device for the uplink video session; and
determine, based on the uplink resource information and the video session request information including the delivery mode requested by the mobile device for the uplink video session, scheduling of the uplink video session via the wireless uplink in the cellular sector, wherein, to determine scheduling of the uplink video session via the wireless uplink in the cellular sector, the processor is configured to:
determine, based on the current resource allocation of the cellular sector, the maximum resource allocation of the cellular sector, and the minimum bit rate acceptable to the mobile device for the uplink video session, whether the cellular sector currently has available wireless uplink resources sufficient to support the uplink video session;
based on a determination that the cellular sector currently has available wireless uplink resources sufficient to support the uplink video session, negotiate a bit rate for the uplink video session and propagate toward the mobile device a response including the negotiated bit rate for the uplink video session, wherein the negotiated bit rate for the uplink video session is greater than or equal to the minimum bit rate acceptable to the mobile device for the uplink video session and less than or equal to the bit rate requested by the mobile device for the uplink video session; and
based on a determination that the cellular sector does not currently have available wireless uplink resources sufficient to support the uplink video session, queue the request by the mobile device to establish the uplink video session.

* * * * *